(12) United States Patent
Han et al.

(10) Patent No.: US 11,290,027 B1
(45) Date of Patent: Mar. 29, 2022

(54) WIRELESS CHARGING RECEIVER CIRCUIT AND CHIP, AND WIRELESS CHARGING RECEIVER

(71) Applicant: Halo Microelectronics Co., Ltd., Foshan (CN)

(72) Inventors: Shuang Han, Foshan (CN); Rui Liu, Freemont, CA (US); Songnan Yang, Frisco, TX (US)

(73) Assignee: Halo Microelectronics Co., Ltd., Foshan (CN)

(*) Notice: Subject to any disclaimer, the term of this patent is extended or adjusted under 35 U.S.C. 154(b) by 0 days.

(21) Appl. No.: 17/410,694

(22) Filed: Aug. 24, 2021

(30) Foreign Application Priority Data

Sep. 23, 2020 (CN) .......................... 202011011827.4

(51) Int. Cl.
*H02M 7/219* (2006.01)
*H02J 50/10* (2016.01)
*H02M 7/00* (2006.01)

(52) U.S. Cl.
CPC ............. *H02M 7/219* (2013.01); *H02J 50/10* (2016.02); *H02M 7/003* (2013.01)

(58) Field of Classification Search
CPC ......... H02M 7/219; H02M 7/003; H02J 50/10
USPC .......................................................... 307/149
See application file for complete search history.

(56) References Cited

U.S. PATENT DOCUMENTS

| 2013/0229062 | A1* | 9/2013 | Bae ...................... H04B 5/0037 307/104 |
| 2013/0300204 | A1* | 11/2013 | Partovi ................... H02J 50/50 307/104 |
| 2018/0131239 | A1* | 5/2018 | Stephenson ............. H02J 50/10 |
| 2018/0219405 | A1* | 8/2018 | Qiu ..................... H02J 7/00045 |

* cited by examiner

*Primary Examiner* — Alfonso Perez Borroto
(74) *Attorney, Agent, or Firm* — Slater Matsil, LLP

(57) ABSTRACT

A wireless charging receiver circuit includes a first bridge arm unit connected to the first node and a common ground node, a second bridge arm unit connected to the second node and the common ground node, a first voltage converter unit connected to the second node and the common ground node, a second voltage converter unit connected to the first node and a common ground node, a filter circuit, a bias power supply circuit, and a control unit configure to control the switch transistors, such that the voltage output terminals of the first voltage converter unit and the second voltage converter unit output a voltage signal.

24 Claims, 15 Drawing Sheets

US 11,290,027 B1

WIRELESS CHARGING RECEIVER CIRCUIT AND CHIP, AND WIRELESS CHARGING RECEIVER

PRIORITY CLAIM

This application claims the benefit of and priority to Chinese Patent Application No. 202011011827.4, filed Sep. 23, 2020, which is hereby incorporated by reference in its entirety.

TECHNICAL FIELD

The present disclosure relates to the technical field of wireless charging, and in particular, relates to a wireless charging receiver circuit and chip, and a wireless charging receiver.

BACKGROUND

At present, it is common to wirelessly charge batteries in smart phones. Since a wireless charging transmitter transmits energy in the form of a magnetic field, the energy of the magnetic field needs to be converted to electric energy using a wireless charging receiver. For high efficiency, coils of the wireless charging receiver are capable of operating at an operating voltage reaching 20 V to reduce power consumption of resistance in the coils. However, a maximum operating voltage of a single battery is less than 5 V. For a minimum power loss during charging of the battery, a high-efficient DC/DC conversion is needed to lower the output voltage of the wireless charging receiver to 5 V or even lower. A charge pump based DC/DC converter is a main topological structure for achieving such a voltage conversion. In a 2:1 voltage down converting ratio, the efficiency may reach 98%.

For system powered by a single-cell battery, two charge pump based DC/DC converters need to be cascaded (first 4:2 and then 2:1), to lower the output voltage of the wireless charging receiver (reaching 20 V) to the voltage of the single-cell battery (5 V). Therefore, three integrated circuit chips are used in front of the battery.

In practice, the wireless charging receiver chip and the high-voltage 4:2 charge pump chip are generally placed together to be proximal to the coils of the wireless charging receiver, and the low-voltage 2:1 charge pump chip is placed to be proximal to a battery connector. This is because an output current of the 2:1 charge pump is four times the output current of the wireless charging receiver. A device with such high output current needs to be placed to be proximal to the load thereof, to reduce power consumption of the resistance in a PCB as much as possible. In a smart phone system, configuration of such components allows the wireless charging receiver and the high-voltage charge pump to be integrated in a single device.

FIG. 1 illustrates a block diagram of a simplified system directly integrating a wireless charging receiver and a charge pump. In FIG. 1, although the wireless charging receiver and the high-voltage charge pump are integrated, since these two devices operate independently of each other. In such integration, filtering needs to be performed at outputs of synchronization rectifiers (Q1 to Q4) and at an output of a primary low dropout regulator (LDO) (Q5). In addition, from the coils to VOUT, five or six power switch devices are connected in series for converting a received alternating-current power supply into a direct-current power supply. Therefore, in the related art, additional filter capacitors ($C_{RECT}$, $C_{PMID}$) need to be configured, and a large number of power switches are used. As a result, a large-size integrated circuit device is needed and the integration cost is higher.

SUMMARY

The present disclosure provides a wireless charging receiver circuit and chip, and a wireless charging receiver, which may reduce the size of an integrated circuit device and lower the integration cost.

In the first aspect, embodiments of the present disclosure provide a wireless charging receiver circuit. The wireless charging receiver circuit includes a first bridge arm unit, a second bridge arm unit, a first voltage converter unit, a second voltage converter unit, a filter circuit, a bias power supply circuit, and a control unit, wherein one terminal of the first bridge arm unit and one terminal of the second voltage converter unit are both connected to a first node, one terminal of the second bridge arm unit and one terminal of the first voltage converter unit are both connected to a second node, and the other terminal of the first bridge arm unit, the other terminal of the second bridge arm unit, the other terminal of the first voltage converter unit, and the other terminal of the second voltage converter unit are all connected to a common ground node. Voltage output terminals of the first voltage converter unit and the second voltage converter unit are both connected to the filter circuit, wherein the first bridge arm unit includes a first switch transistor and a second switch transistor, wherein the first switch transistor and the second switch transistor are series-connected in a same direction, and a connection node between a source of the first switch transistor and a drain of the second switch transistor is a first connection node, and a non-inverting output terminal of an externally input alternating current signal being connected to the first connection node, the second bridge arm unit includes a third switch transistor and a fourth switch transistor, wherein the third switch transistor and the fourth switch transistor are series-connected in a same direction, and a connection node between a source of the third switch transistor and a drain of the fourth switch transistor is a second connection node, an inverting output terminal of the alternating current signal being connected to the second connection node, the bias power supply circuit is arranged between the first connection node and the second connection node, and is configured to supply a startup power supply, and the control unit is connected to the first bridge arm unit, the second bridge arm unit, the first voltage converter unit, and the second voltage converter unit, and is configured to control turn-on or turn-off of the switch transistors based on the externally input alternating current signal, such that the voltage output terminals of the first voltage converter unit and the second voltage converter unit output a voltage signal.

In a second aspect, embodiments of the present disclosure further provide a wireless charging receiver chip. The wireless charging receiver chip includes a wireless charging receiver circuit. The wireless charging receiver circuit includes a first bridge arm unit, a second bridge arm unit, a first voltage converter unit, a second voltage converter unit, a filter circuit, a bias power supply circuit, and a control unit.

One terminal of the first bridge arm unit and one terminal of the second voltage converter unit are both connected to a first node, one terminal of the second bridge arm unit and one terminal of the first voltage converter unit are both connected to a second node, and the other terminal of the first bridge arm unit, the other terminal of the second bridge arm unit, the other terminal of the first voltage converter unit, and the other terminal of the second voltage converter unit are all connected to a common ground node.

The voltage output terminals of the first voltage converter unit and the second voltage converter unit are both connected to the filter circuit, wherein the first bridge arm unit comprises a first switch transistor and a second switch transistor, wherein the first switch transistor and the second switch transistor are series-connected in a same direction, and a connection node between a source of the first switch transistor and a drain of the second switch transistor is a first connection node, and a non-inverting output terminal of an externally input alternating current signal being connected to the first connection node.

The second bridge arm unit comprises a third switch transistor and a fourth switch transistor, wherein the third switch transistor and the fourth switch transistor are series-connected in a same direction, and a connection node between a source of the third switch transistor and a drain of the fourth switch transistor is a second connection node, an inverting output terminal of the alternating current signal being connected to the second connection node.

The bias power supply circuit is arranged between the first connection node and the second connection node, and is configured to supply a startup power and the control unit is connected to the first bridge arm unit, the second bridge arm unit, the first voltage converter unit, and the second voltage converter unit, and is configured to control turn-on or turn-off of the switch transistors based on the externally input alternating current signal, such that the voltage output terminals of the first voltage converter unit and the second voltage converter unit output a voltage signal.

In a third aspect, embodiments of the present disclosure further provide a wireless charging receiver. The wireless charging receiver includes a wireless charging receiver coil and the wireless charging receiver chip as described above, wherein the wireless charging receiver coil is configured to generate the alternating current signal.

The present disclosure provides a wireless charging receiver circuit and chip, and a wireless charging receiver. The wireless charging receiver circuit includes a first bridge arm unit, a second bridge arm unit, a first voltage converter unit, a second voltage converter unit, and a control unit. One terminal of the first bridge arm unit and one terminal of the second voltage converter unit are both connected to a first node, one terminal of the second bridge arm unit and one terminal of the first voltage converter unit are both connected to a second node, and the other terminal of the first bridge arm unit, the other terminal of the second bridge arm unit, the other terminal of the first voltage converter unit, and the other terminal of the second voltage converter unit are all connected to a common ground node. The first bridge arm unit includes a first switch transistor and a second switch transistor. The first switch transistor and the second switch transistor are series-connected in a same direction. A connection node between a source of the first switch transistor and a drain of the second switch transistor is a first connection node, and a non-inverting output terminal of an externally input alternating current signal is connected to the first connection node. The second bridge arm unit includes a third switch transistor and a fourth switch transistor. The third switch transistor and the fourth switch transistor are series-connected in a same direction. A connection node between a source of the third switch transistor and a drain of the fourth switch transistor is a second connection node, and an inverting output terminal of the alternating current signal is connected to the second connection node. In this way, the external filter capacitors are reduced, and thus the size of the integrated circuit device is reduced, and the integration cost is lowered.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

For clearer descriptions of the objectives, technical solutions, and advantages of the embodiments of the present disclosure, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. Based on the embodiments of the present disclosure, all other embodiments derived by persons of ordinary skill in the art without any creative efforts shall fall within the protection scope of the present disclosure.

Figure 2:
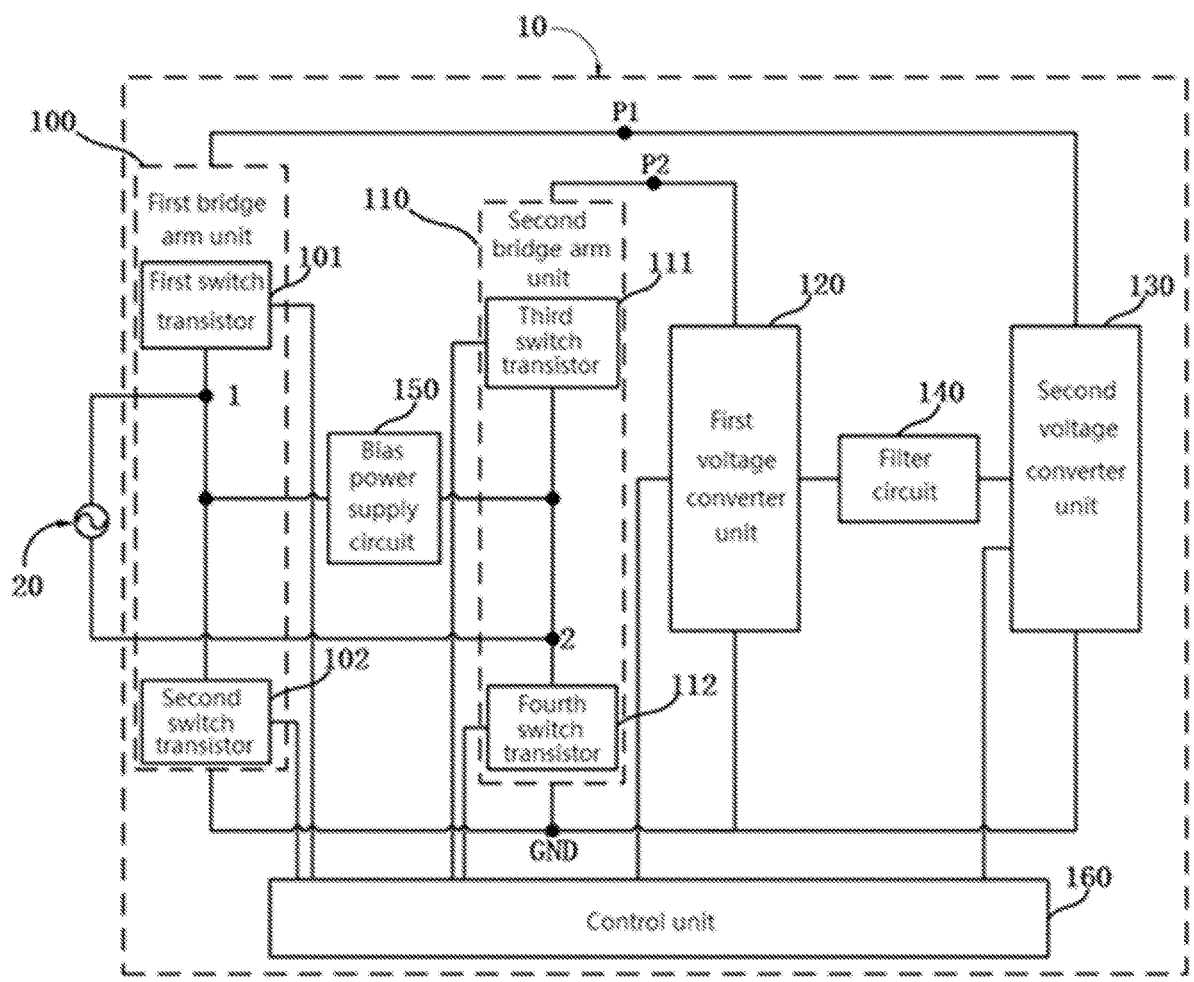
FIG. 2 is a schematic circuit diagram of a wireless charging receiver circuit according to an embodiment of the present disclosure.

Referring to FIG. 2, FIG. 2 is a schematic circuit diagram of a wireless charging receiver circuit according to an embodiment of the present disclosure. A wireless charging receiver circuit 10 includes a first bridge arm unit 100, a second bridge arm unit 110, a first voltage converter unit 120, a second voltage converter unit 130, a filter circuit 140, a bias power supply circuit 150, and a control unit 160.

Specifically, one terminal of the first bridge arm unit 100 and one terminal of the second voltage converter unit 130 are both connected to a first node P1. One terminal of the second bridge arm unit 110 and one terminal of the first voltage converter unit 120 are both connected to a second node P2. The other terminal of the first bridge arm unit 100, the other terminal of the second bridge arm unit 110, the other terminal of the first voltage converter unit 120, and the other terminal of the second voltage converter unit 130 are all connected to a common ground node GND. Voltage output terminals of the first voltage converter unit 120 and the second voltage converter unit 130 are both connected to the filter circuit 140. The first bridge arm unit 100 includes a first switch transistor 101 and a second switch transistor 102. The first switch transistor 101 and the second switch transistor 102 are series-connected in a same direction. A connection node between a source of the first switch transistor 101 and a drain of the second switch transistor 102 is a first connection node 1, and a non-inverting output terminal of an externally input alternating current signal 20 is connected to the first connection node 1. The second bridge arm unit 110 includes a third switch transistor 111 and a fourth switch transistor 112. The third switch transistor 111 and the fourth switch transistor 112 are series-connected in a same direction. A connection node between a source of the third switch transistor 111 and a drain of the fourth switch transistor 112 is a second connection node 2, and an inverting output terminal of the alternating current signal 20 is connected to the second connection node 2. The bias power supply circuit 150 is arranged between the first connection node 1 and the second connection node 2. The control unit 160 is connected to the first bridge arm unit 100, the second bridge arm unit 110, the first voltage converter unit 120, and the second voltage converter unit 130.

The bias power supply circuit 150 is configured to supply a startup power. The control unit 160 is configured to control the turn-on or turn-off of the switch transistors based on an externally input alternating current signal 20, such that voltage output terminals of the first voltage converter unit 120 and the second voltage converter unit 130 each outputs a voltage signal. The voltage signal is filtered by the filter circuit 140, and then output to a load terminal.

In practice, when the alternating current signal 20 is just input to the wireless charging receiver circuit 10, first, the bias power supply circuit 150 receives power, and then the bias power supply circuit 150 supplies a desired operating voltage to the control unit 160. The control unit 160, after a startup process, is capable of controlling the turn-on or turn-off of the switch transistors.

Figure 3:
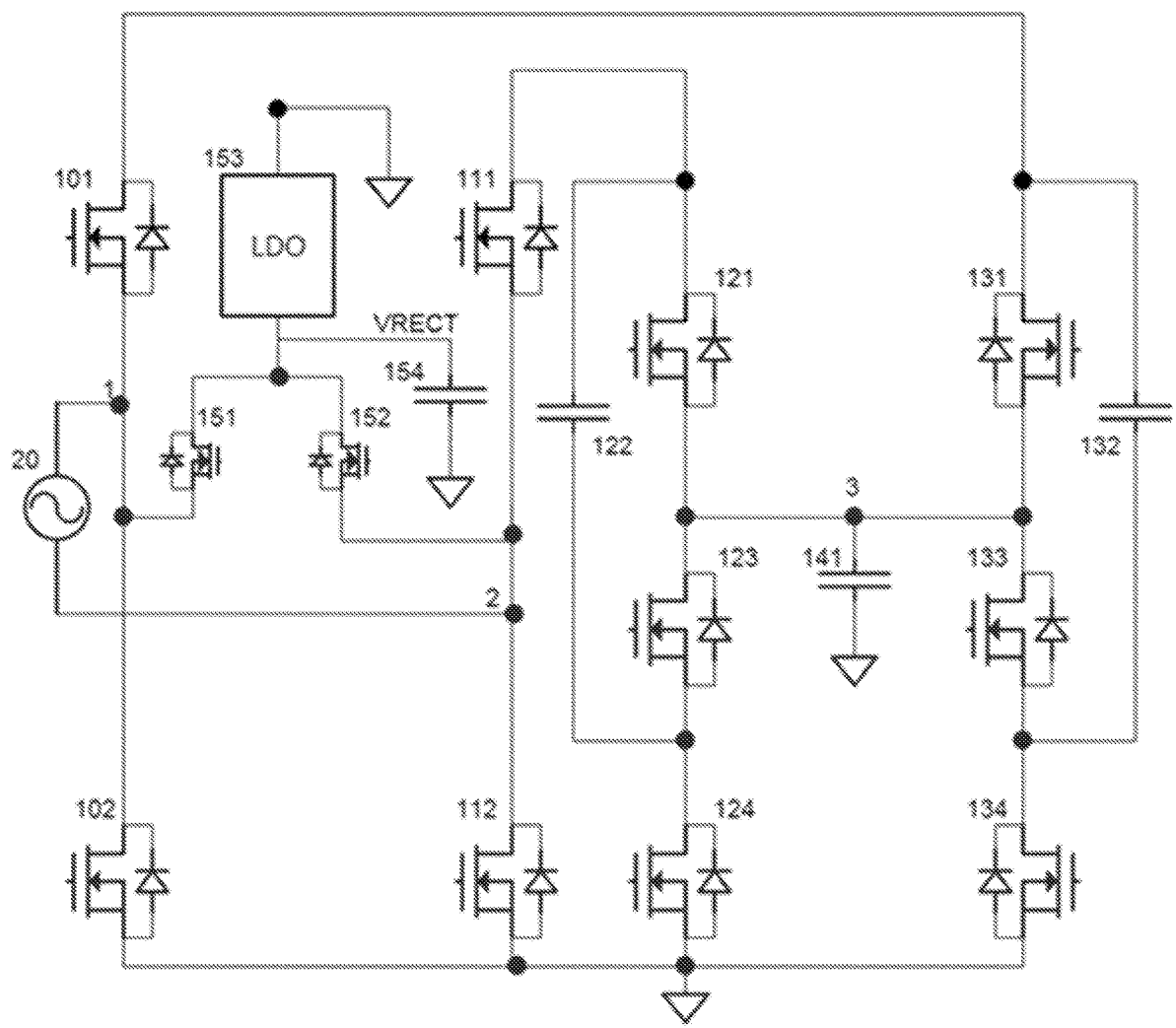
FIG. 3 is a schematic circuit diagram of a wireless charging receiver circuit according to an embodiment of the present disclosure.

Optionally, referring to FIG. 3 in combination with FIG. 2, the bias power supply circuit 150 includes a first bias switch transistor 151, a second bias switch transistor 152, a low-dropout regulator 153, and a second filter capacitor 154.

Specifically, a voltage input terminal of the low-dropout regulator 153 is connected to a drain of the first bias switch transistor 151, a drain of the second bias switch transistor 152, and one terminal of the second filter capacitor 154. A source of the first bias switch transistor 151 is connected to the first connection node 1. A source of the second bias switch transistor 152 is connected to the second connection node 2. The other terminal of the second filter capacitor 154 is connected to ground.

In one aspect, the bias power supply circuit 150 is intended to act as a startup bias power supply. In the case that the alternating current signal 20 is initially applied to the wireless charging receiver circuit 10, a bias power supply VRECT is provided to the low-dropout regulator 153 by the first bias switch transistor 151, the second bias switch transistor 152, the second switch transistor 102, and the fourth switch transistor 112, and by filtering by the second filter capacitor 154. The bias power supply VRECT acts as a startup power supply of the control unit 160. In this way, in the case that the wireless charging receiver circuit according to the present disclosure is placed on a wireless charging transmitter, the wireless charging receiver circuit may be automatically started up with no need of an external bias power supply. In another aspect, the bias power supply circuit 150 is intended to use the voltage from the bias power supply VRECT as a monitor of the voltage of a receiver coil, and in turn to regulate an output power of the wireless charging transmitter such that a desired output voltage is acquired at a wireless receiver end.

Optionally, the filter circuit 140 includes a first filter capacitor 141. One terminal of the first filter capacitor 141 is connected to a third connection node 3, and the other terminal of the first filter capacitor 141 is connected to ground.

In another embodiment, still referring to FIG. 3 in combination with FIG. 2, the first voltage converter unit 120 includes a first capacitor 122, and a fifth switch transistor 121, a sixth switch transistor 123, and a seventh switch transistor 124 that are successively series-connected in a same direction. A unit formed by the fifth switch transistor 121 and the sixth switch transistor 123 series-connected in the same direction is connected in parallel with the first capacitor 122. That is, one terminal of the first capacitor 122 is connected to a drain of the fifth switch transistor 121, and the other terminal of the first capacitor 122 is connected to a source of the sixth switch transistor 123. A source of the seventh switch transistor 124 is connected to ground. The second voltage converter unit 130 includes a second capacitor 132, and an eighth switch transistor 131, a ninth switch transistor 133, and a tenth switch transistor 134 that are successively series-connected in a same direction. A unit formed by the eighth switch transistor 131 and the ninth switch transistor 133 series-connected in the same direction is connected in parallel with the second capacitor 132. That is, one terminal of the second capacitor 132 is connected to a drain of the eighth switch transistor 131, and the other terminal of the second capacitor 132 is connected to a source of the ninth switch transistor 133. A source of the tenth switch transistor 134 is connected to ground. A connection node between the fifth switch transistor 121 and the sixth switch transistor 123, and a connection node between the eighth switch transistor 131 and the ninth switch transistor 133 are both connected to the filter circuit 140 at the third connection node 3.

Further, the control unit 160 controls the turn-on or turn-off of the switch transistors as illustrated in FIG. 3, such that the wireless charging receiver circuit 10 operates in different operating modes. For example, the operating modes may include a bypass mode, a charge pump mode, a reverse bypass mode, and a reverse charge pump mode.

In the case that the wireless charging receiver circuit 10 operates in the bypass mode, in response to voltages on the first capacitor 122 and the second capacitor 132 being less than a first predetermined voltage, the control unit 160 controls the seventh switch transistor 124 and the tenth switch transistor 134 to be turned on. In response to the voltages on the first capacitor 122 and the second capacitor 132 being greater than or equal to the first predetermined voltage, the control unit 160 continues controlling the fifth switch transistor 121 and the eighth switch transistor 131 to be turned on. In response to a voltage on the third connection node 3 being greater than or equal to a second predetermined voltage, the control unit 160 controls the first switch transistor 101 and the fourth switch transistor 112 to be turned on together in alternate with the second switch transistor 102 and the third switch transistor 111 in a mode of synchronous rectification.

In practice, in the bypass mode, the seventh switch transistor 124 and the tenth switch transistor 134 are constantly in a turn-on state, whereas the sixth switch transistor 123 and the ninth switch transistor 133 are constantly in a turn-off state, such that a voltage on the first filter capacitor 141 is maintained at zero. The first switch transistor 101, the second switch transistor 102, the third switch transistor 111, and the fourth switch transistor 112 operate as a full-wave synchronous rectifier. The first capacitor 122 and the second capacitor 132 act as output filter capacitors of the synchronous rectifier. The fifth switch transistor 121 and the eighth switch transistor 131 act as output low dropout regulators (LDOs). In the case that the wireless charging receiver circuit according to the present disclosure is placed on the wireless charging transmitter, the low dropout regulator 153 first turns on the sixth switch transistor 123 and the ninth switch transistor 133, and meanwhile maintains the other switch transistors in a turn-off state. Parasitic diodes of the first switch transistor 101, the second switch transistor 102, the third switch transistor 111, and the fourth switch transistor 112 act as a full-wave rectifier and are turned on to generate a voltage across the first capacitor 122 and the second capacitor 132. In response to the voltages on the first capacitor 122 and the second capacitor 132 reaching a target value, the fifth switch transistor 121 and the eighth switch transistor 131 are turned on, such that the first filter capacitor 141 acquires a charge voltage, that is, the voltage on the third connection node 3. In response to an output power of the third connection node 3 reaching a predetermined value, the first switch transistor 101, the second switch transistor 102, the third switch transistor 111, and the fourth switch transistor 112 act as a synchronous rectifier, such that the efficiency of the entire system is improved. The VRECT voltage is constantly monitored, and the output power of the wireless charging transmitter is controlled based on different output load states or load transient states, to regulate the voltage on the third connection node 3.

In the case that the wireless charging receiver circuit 10 operates in the charge pump mode, in response to the alternating current signal 20 being in a positive half cycle, the control unit 160 controls the first switch transistor 101, the fourth switch transistor 112, the fifth switch transistor 121, the seventh switch transistor 124 and the ninth switch transistor 133 to be turned on. In response to the alternating current signal 20 being in a negative half cycle, the control unit 160 controls the second switch transistor 102, the third switch transistor 111, the sixth switch transistor 123, the eighth switch transistor 131, and the tenth switch transistor 134 to be turned on and controls the other switch transistors to be turned off.

In the charge pump mode, the fifth switch transistor 121 and the eighth switch transistor 131 no longer function as the low dropout regulators. The first switch transistor 101, the eighth switch transistor 131, the ninth switch transistor 133, the tenth switch transistor 134, and the second capacitor 132 constitute one phase of a 4:2 charge pump. The third switch transistor 111, the fifth switch transistor 121, the sixth switch transistor 123, the seventh switch transistor 124, and the first capacitor 122 constitute the other phase of the 4:2 charge pump. The charge pump operates in an operating frequency equal to that of the wireless charging transmitter, and a 180-degree phase shift is produced between the two phases of circuits of the charge pump.

Figure 1:
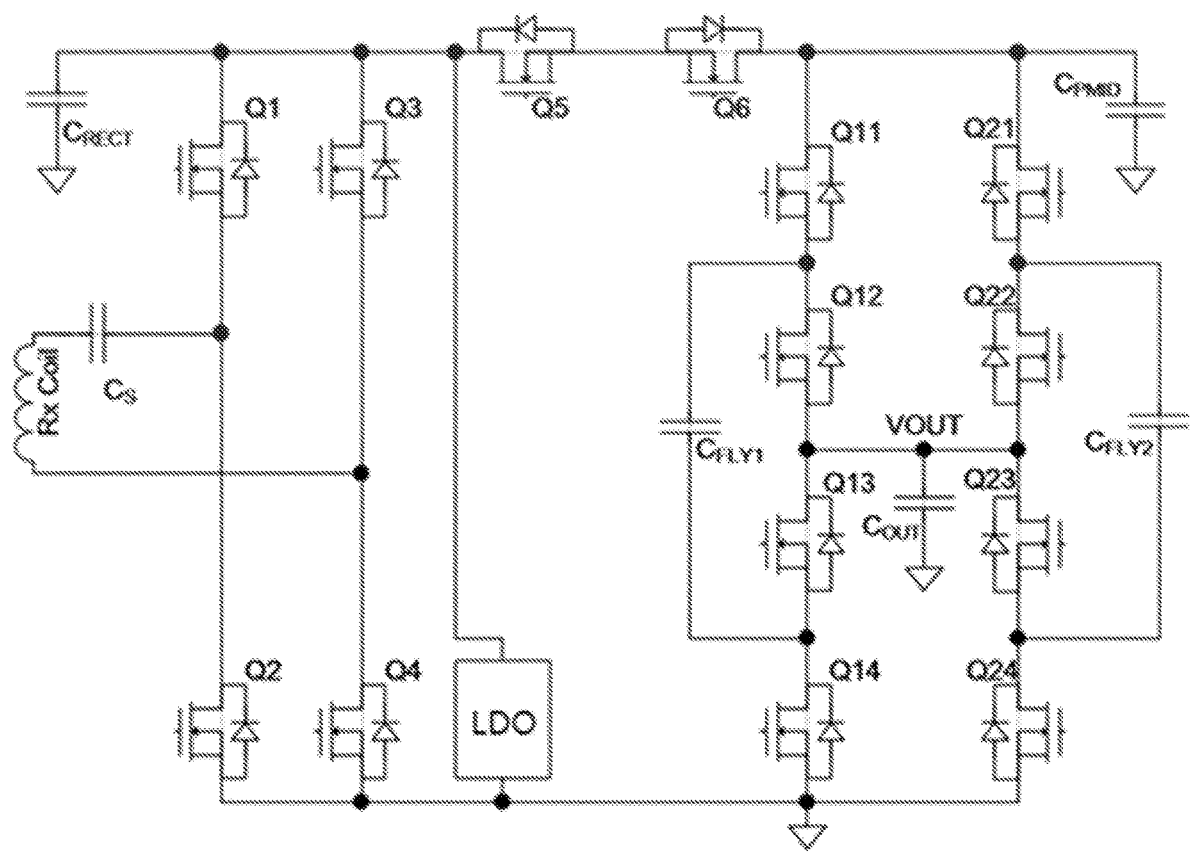
FIG. 1 is a schematic circuit diagram of a wireless charging receiver circuit in the related art.

The first capacitor 122 and the second capacitor 132 are generally alternately charged by the alternating current signal 20. With such a solution, a large surge current may not be generated during the startup process. In addition, during a transition between the bypass mode and the charge pump mode, no large surge current may be generated. In this way, at the minimum, the switch transistor Q5 and the switch transistor Q6, as illustrated in FIG. 1, can be eliminated, and thus power consumption during operation of the circuit is reduced and high power conversion efficiency is achieved. In addition, the current signal traveling through the first bridge arm unit 100 and the second bridge arm unit 110 may directly charge the first capacitor 122 and the second capacitor 132. Therefore, the synchronous rectifier does not need to be filtered, and thus capacitors $C_{RECT}$ and $C_{PMID}$, as illustrated in FIG. 1, may be omitted and external elements and required PCB area are reduced.

Figure 4:
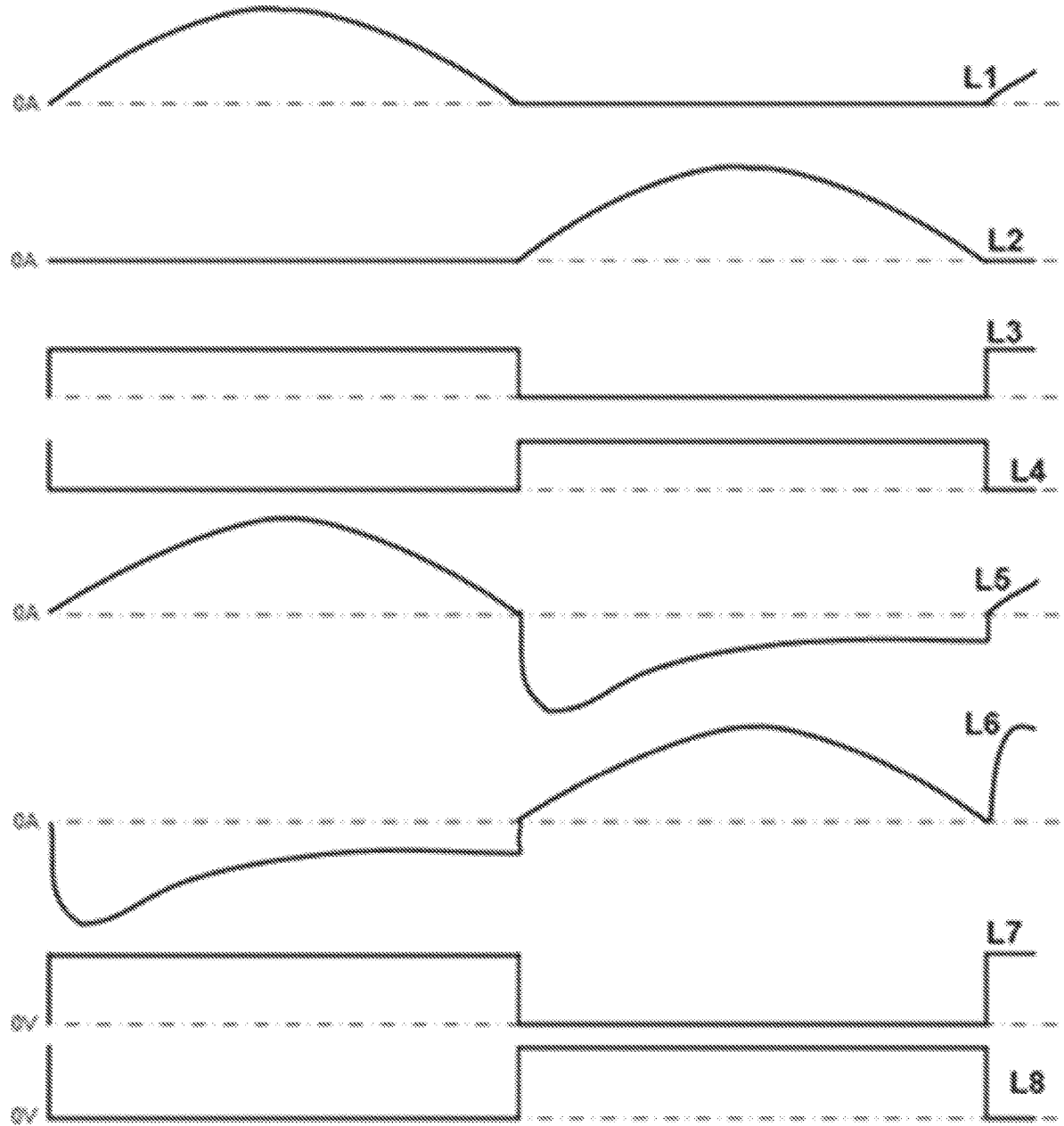
FIG. 4 is a waveform diagram of a current and a voltage in the wireless charging receiver circuit according to an embodiment of the present disclosure.

A waveform of a current and a voltage in the wireless charging receiver circuit in the charge pump mode is as illustrated in FIG. 4. Referring to FIG. 4 in combination with FIG. 3, a curve L1 is a curve of a current signal traveling through the first switch transistor 101 in the case that the alternating current signal 20 is in the positive half cycle. A curve L2 is a curve of a current signal traveling through the third switch transistor 111 in the case that the alternating current signal 20 is in the negative half cycle. A curve L3 reflects switch signals of the first switch transistor 101, the fourth switch transistor 112, the fifth switch transistor 121, the seventh switch transistor 124 and the ninth switch transistor 133. A curve L4 represents switch signals of the second switch transistor 102, the third switch transistor 111, the sixth switch transistor 123, the eighth switch transistor 131 and the tenth switch transistor 134. A curve L5 reflects a current signal traveling through the second capacitor 132. A curve L6 reflects a current signal traveling through the first capacitor 122. A curve L7 reflects a voltage signal on the first connection node 1. A curve L8 reflects a voltage signal on the second connection node 2.

In the positive half cycle of the alternating current signal 20, starting from point 0 of the curve, the first switch transistor 101, the fourth switch transistor 112, and the ninth switch transistor 133 are being turned on. The voltage on the first connection node 1 is twice the voltage on the third connection node 3, and the voltage on the second connection node 2 is clamped to ground, that is, a voltage at a highest point on the curve L7 is twice the voltage on the third connection node 3. During this time period, the second capacitor 132 and the first filter capacitor 141 are charged by the alternating current signal 20 in the positive half cycle, and a current on the curve L5 starts increasing. Meanwhile, the fifth switch transistor 121 and the seventh switch transistor 124 are turned on, such that the first capacitor 122 is discharged to the first filter capacitor 141, and a current on the curve L6 starts decreasing. Once the positive half cycle of the alternating current signal 20 reaches zero, the first switch transistor 101, the fourth switch transistor 112, and the ninth switch transistor 133 are turned off under a zero current. Afterwards, in the negative half cycle of the alternating current signal 20, the eighth switch transistor 131 and the tenth switch transistor 134 are turned on, and energy stored in the second capacitor 132 is transferred to the first filter capacitor 141, and thus the current on the curve L5 starts decreasing. The second switch transistor 102, the third switch transistor 111, and the sixth switch transistor 123 are turned on, and the alternating current signal 20 in the negative half cycle charges the first capacitor 122 and the first filter capacitor 141, and thus the current on the curve L6 starts increasing. During this time period, the fifth switch transistor 121 and the seventh switch transistor 124 are turned off. In the case that the negative half cycle of the alternating current signal 20 reaches zero, the second switch transistor 102, the third switch transistor 111, and the ninth switch transistor 133 are turned off at the zero current, and then the alternating current signal 20 enters another positive half cycle, and the entire process is cyclically performed.

In the case that the wireless charging receiver circuit 10 operates in the reverse bypass mode, the control unit 160 controls the fifth switch transistor 121, the seventh switch transistor 124, the eighth switch transistor 131 and the tenth switch transistor 134 to be turned on, and meanwhile controls the sixth switch transistor 123 and the ninth switch transistor 133 to be turned off. The control unit 160 controls the first switch transistor 101 and the fourth switch transistor 112 to be turned on or turned off phase-complementarily with the second switch transistor 102 and the third switch transistor 111 at a first predetermined switching frequency.

In the case that the wireless charging receiver circuit 10 operates in the reverse bypass mode, the fifth switch transistor 121, the seventh switch transistor 124, the eight switch transistor 131, and the tenth switch transistor 134 are constantly in a turn-on state, and meanwhile the sixth switch transistor 123 and the ninth switch transistor 133 are constantly in a turn-off state. The first capacitor 122 and the second capacitor 132 are constantly connected to ground by the seventh switch transistor 124 and the tenth switch transistor 134, and act as bypass capacitors of a full-bridge inverter. The first switch transistor 101 and the fourth switch transistor 112 are turned on or turned off phase-complementarily with the second switch transistor 102 and the third switch transistor 111 at a same predetermined switching frequency, and thus a direct-current voltage applied to the full-bridge inverter is equal to the voltage applied to the third connection node 3.

In the case that the wireless charging receiver circuit 10 operates in the reverse charge pump mode, the control unit 160 controls a first switch transistor group constituted by the first switch transistor 101, the fourth switch transistor 112, the fifth switch transistor 121, the seventh switch transistor 124, and the ninth switch transistor 133 to be turned on or turned off at a second predetermined switching frequency. The control unit 160 controls a second switch transistor group constituted by the second switch transistor 102, the third switch transistor 111, the sixth switch transistor 123, the eighth switch transistor 131, and the tenth switch transistor 134 to be turned on or turned off phase-complementarily with the first switch transistor group at the second predetermined switching frequency.

In a reverse 1:2 charge pump mode, the sixth switch transistor 123 and the ninth switch transistor 133 are turned on or turned off under the same control signal intended to control the third switch transistor 111 and the first switch transistor 101. The fifth switch transistor 121 and the seventh switch transistor 124 are controlled under the same control signal intended to control the first switch transistor 101. The eighth switch transistor 131 and the tenth switch transistor 134 are controlled under the same control signal intended to control the third switch transistor 111. In such an operating mode, the direct-current voltage applied to the full-bridge inverter is twice the voltage applied to the connection node 3. This reverse charge mode is equivalent to series-connecting the wireless charging transmitter to a 1:2 charge pump, and the voltage at the input terminal of the wireless charging transmitter is doubled from the voltage applied to the third connection node 3. In the reverse 1:2 charge pump mode, the switching frequency is equal to an operating frequency of an equivalent transmitter.

Figure 5:
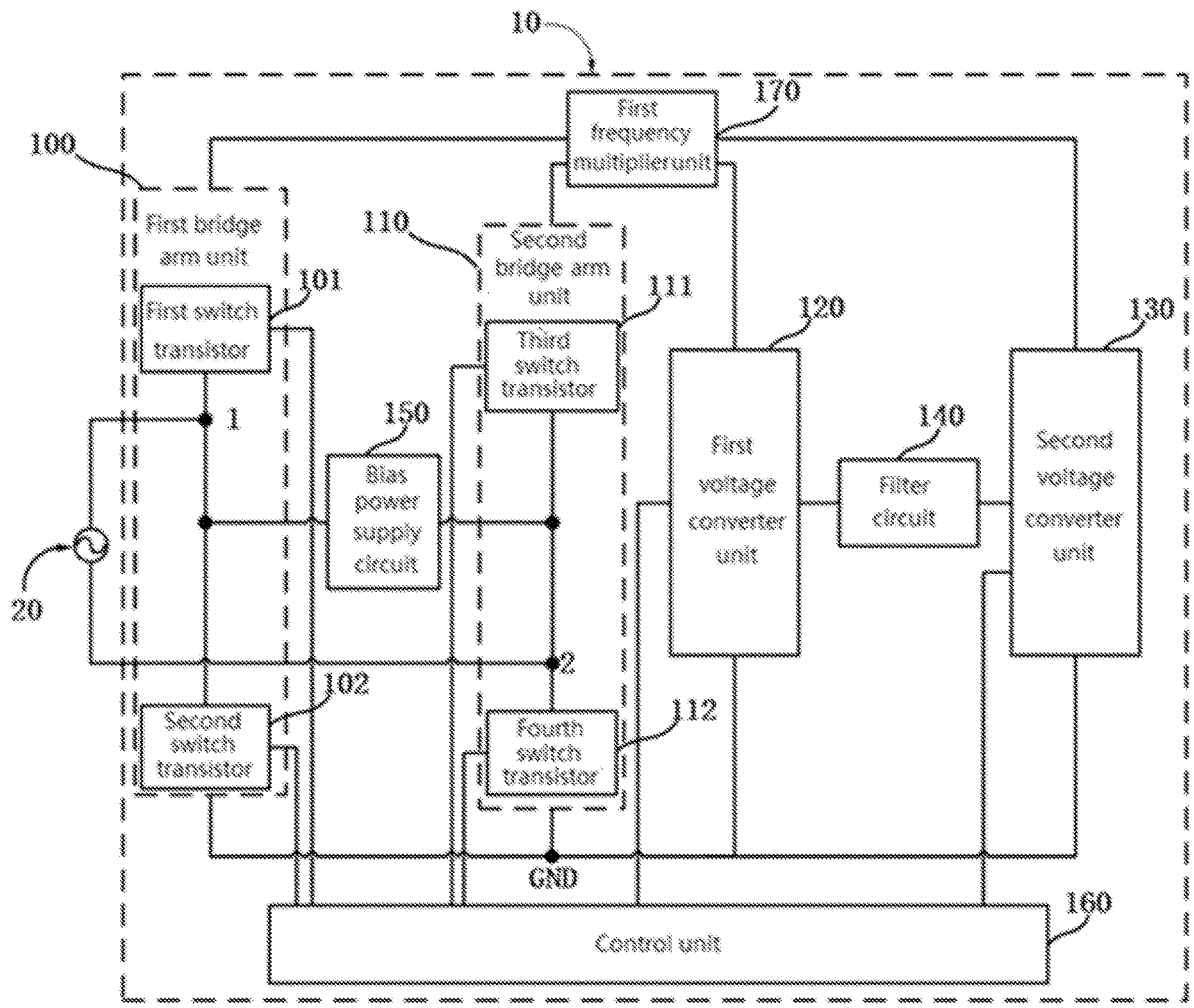
FIG. 5 is a schematic circuit diagram of a wireless charging receiver circuit according to an embodiment of the present disclosure.

In an embodiment, as illustrated in FIG. 5, the wireless charging receiver circuit 10 further includes a first frequency multiplier unit 170. The first frequency multiplier unit 170 is connected to the first bridge arm unit 100, the second bridge arm unit 110, the first voltage converter unit 120, and the second voltage converter unit 130. With the first frequency multiplier unit 170, the first voltage converter unit 120 and the second voltage converter unit 130 operate in a switching frequency that is an integer multiple of a frequency of the alternating current signal 20.

Figure 5A:
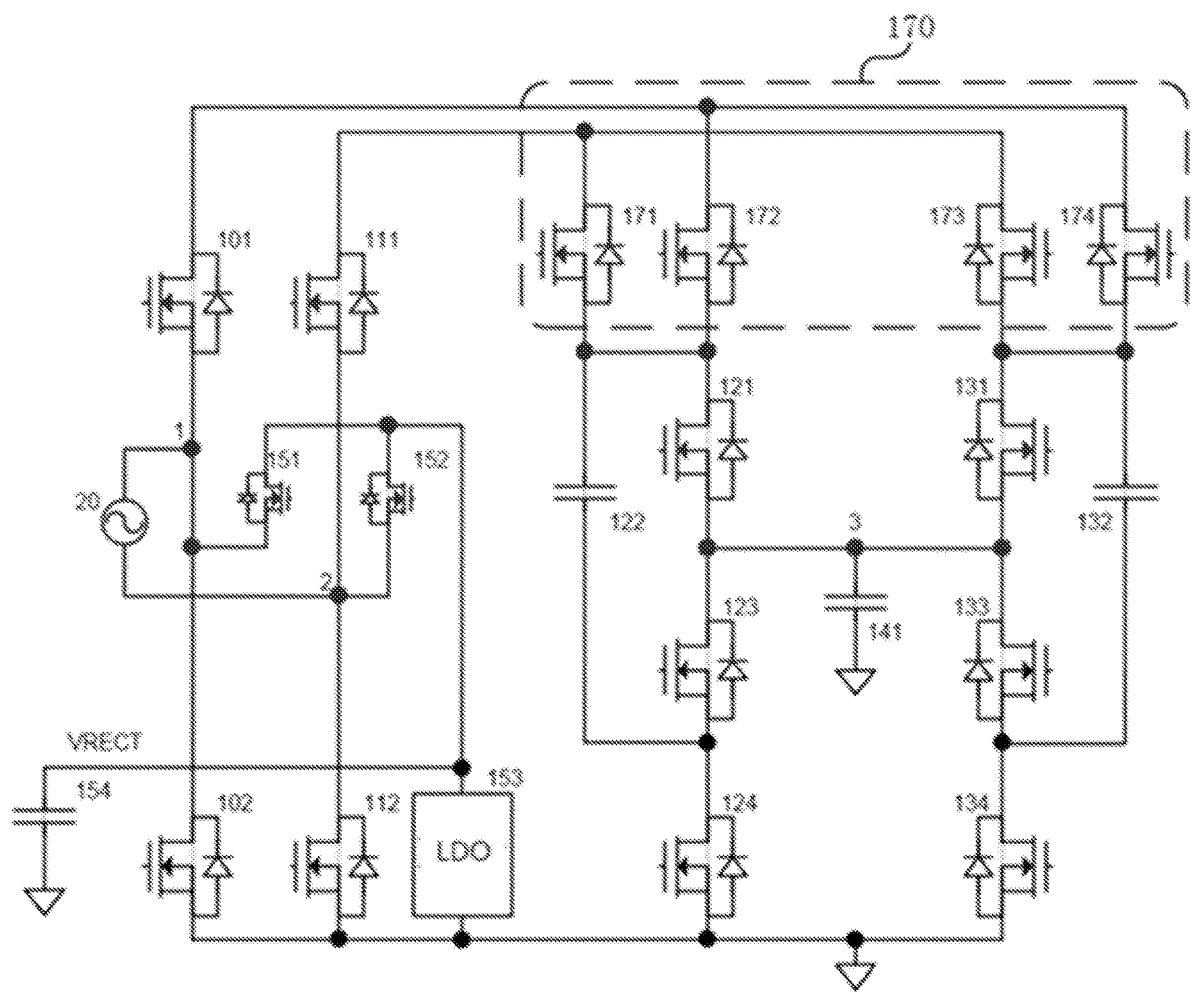
FIG. 5a is a schematic circuit diagram of a wireless charging receiver circuit according to an embodiment of the present disclosure.

Optionally, as illustrated in FIG. 5a, the first frequency multiplier unit 170 includes an eleventh switch transistor 171, a twelfth switch transistor 172, a thirteenth switch transistor 173, and a fourteenth switch transistor 174. A source of the eleventh switch transistor 171 is connected to a source of the twelfth switch transistor 172. A drain of the eleventh switch transistor 171 is connected to a drain of the third switch transistor 111. A drain of the twelfth switch transistor 172 is connected to a drain of the first switch transistor 101. A source of the thirteenth switch transistor 173 is connected to a source of the fourteenth switch transistor 174. A drain of the thirteenth switch transistor 173 is connected to the drain of the third switch transistor 111, and a drain of the fourteenth switch transistor 174 is connected to the drain of the first switch transistor 101.

In practice, in the case that the wireless charging receiver circuit 10 operates in a charge pump mode, between a starting point of a positive half cycle and a peak of the positive half cycle of the alternating current signal 20, the control unit 160 controls the first switch transistor 101, the fourth switch transistor 112, the fifth switch transistor 121, the seventh switch transistor 124, the ninth switch transistor 133, and the fourteenth switch transistor 174 to be turned on, and controls the other switch transistors to be turned off. Between the peak of the positive half cycle and an end of the positive half cycle of the alternating current signal 20, the control unit 160 maintains the first switch transistor 101 and the fourth switch transistor 112 in a turn-on state, controls the sixth switch transistor 123, the eighth switch transistor 131, the tenth switch transistor 134, and the twelfth switch transistor 172 to be turned on, and controls the other switch transistors to be turned off. Between a starting point of a negative half cycle and a peak of the negative half cycle of the alternating current signal 20, the control unit 160 controls the second switch transistor 102, the third switch transistor 111, the fifth switch transistor 112, the seventh switch transistor 124, the ninth switch transistor 133, and the thirteenth switch transistor 173 to be turned on, and controls the other switch transistors to be turned off. Between the peak of the negative half cycle and an end of the negative half cycle of the alternating current signal 20, the control unit 160 maintains the second switch transistor 102 and the third switch transistor 111 in the turn-on state, controls the sixth switch transistor 123, the eighth switch transistor 131, the tenth switch transistor 134, and the eleventh switch transistor 171 to be turned on, and controls the other switch transistors to be turned off.

In the case that the first switch transistor 101 is turned on, the eleventh switch transistor 171 and the thirteenth switch transistor 173 allow two phases of the charge pump to be charged. Likewise, in the case that the third switch transistor 111 is turned on, the twelfth switch transistor 172 and the fourteenth switch transistor 174 allow two phases of the charge pump to be charged. From a starting point of the positive half cycle of the alternating current signal 20, the first switch transistor 101 and the fourth switch transistor 112 are turned on. The fourteenth switch transistor 174 and the ninth switch transistor 133 are turned on to allow the alternating current signal 20 to charge the second capacitor 132 and the first filter capacitor 141, and meanwhile, during this time period, the fifth switch transistor 121 and the seventh switch transistor 124 are turned on to allow the first capacitor 122 to discharge to the first filter capacitor 141. In response to reaching the peak of the positive half cycle of the alternating current signal 20, the fifth switch transistor 121 and seventh switch transistor 124 are turned off. The twelfth switch transistor 172 and the sixth switch transistor 123 are turned on, and the alternating current signal 20 starts charging the first capacitor 122 and the first filter capacitor 141. Meanwhile, the fourteenth switch transistor 174 and the ninth switch transistor 133 are turned off, and the eighth switch transistor 131 and the tenth switch transistor 134 are turned on, to transfer energy stored in the second capacitor 132 to the first filter capacitor 141. In the case that the current of the alternating current signal 20 is reversed, the second switch transistor 102 and the third switch transistor 111 are turned on, and then the above operations are cyclically performed. Under this operating condition, the switching frequency of the charge pump is twice the operating frequency of the wireless charging transmitter.

Figure 6:
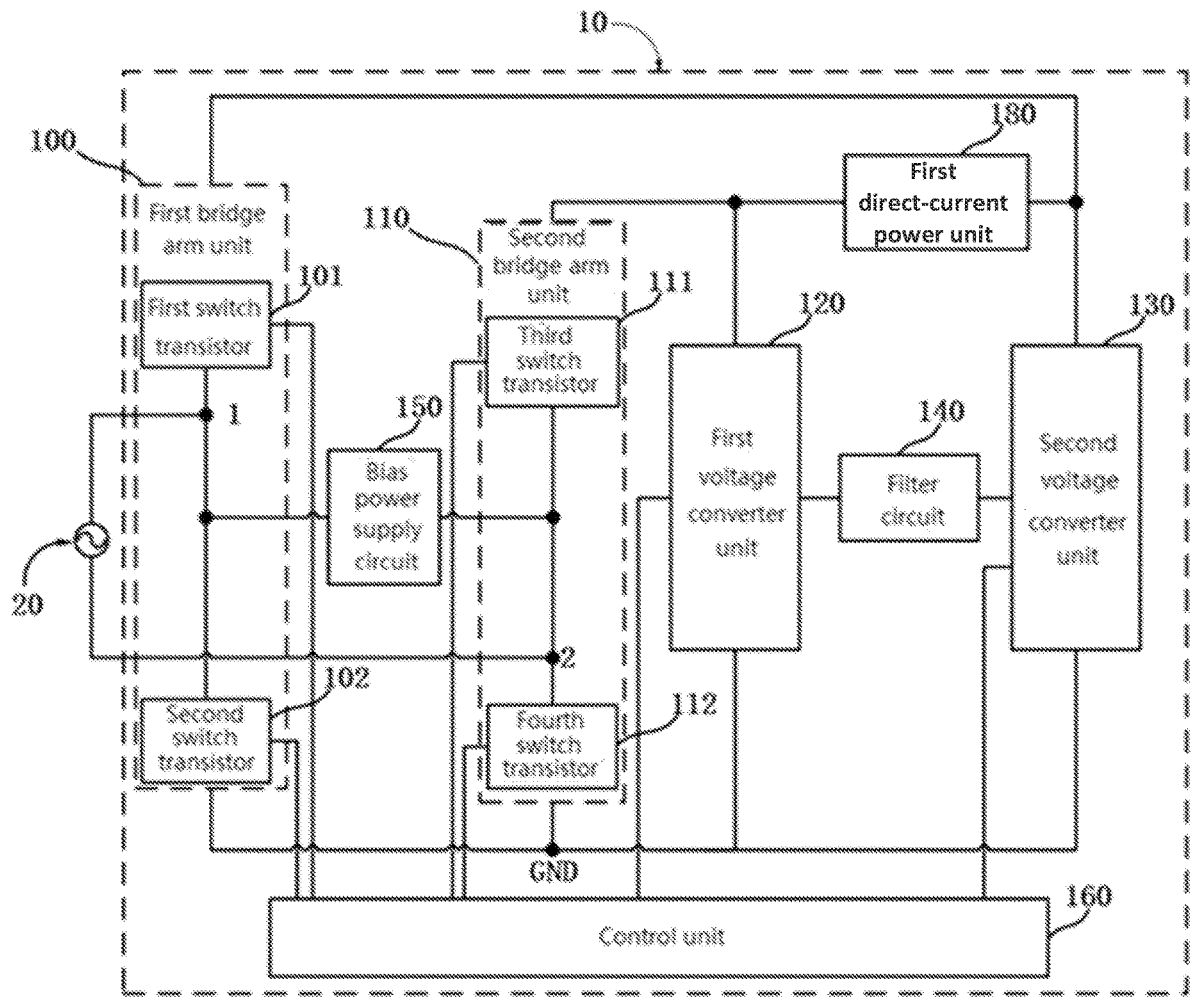
FIG. 6 is a schematic circuit diagram of a wireless charging receiver circuit according to an embodiment of the present disclosure.

In another embodiment, as illustrated in FIG. 6, the wireless charging receiver circuit 10 further includes a first direct-current power unit 180. The first direct-current power unit 180 is configured to act as a direct-current power supply. The operating mode of the wireless charging receiver circuit 10 further includes a direct-current input charge pump mode.

Figure 6A:
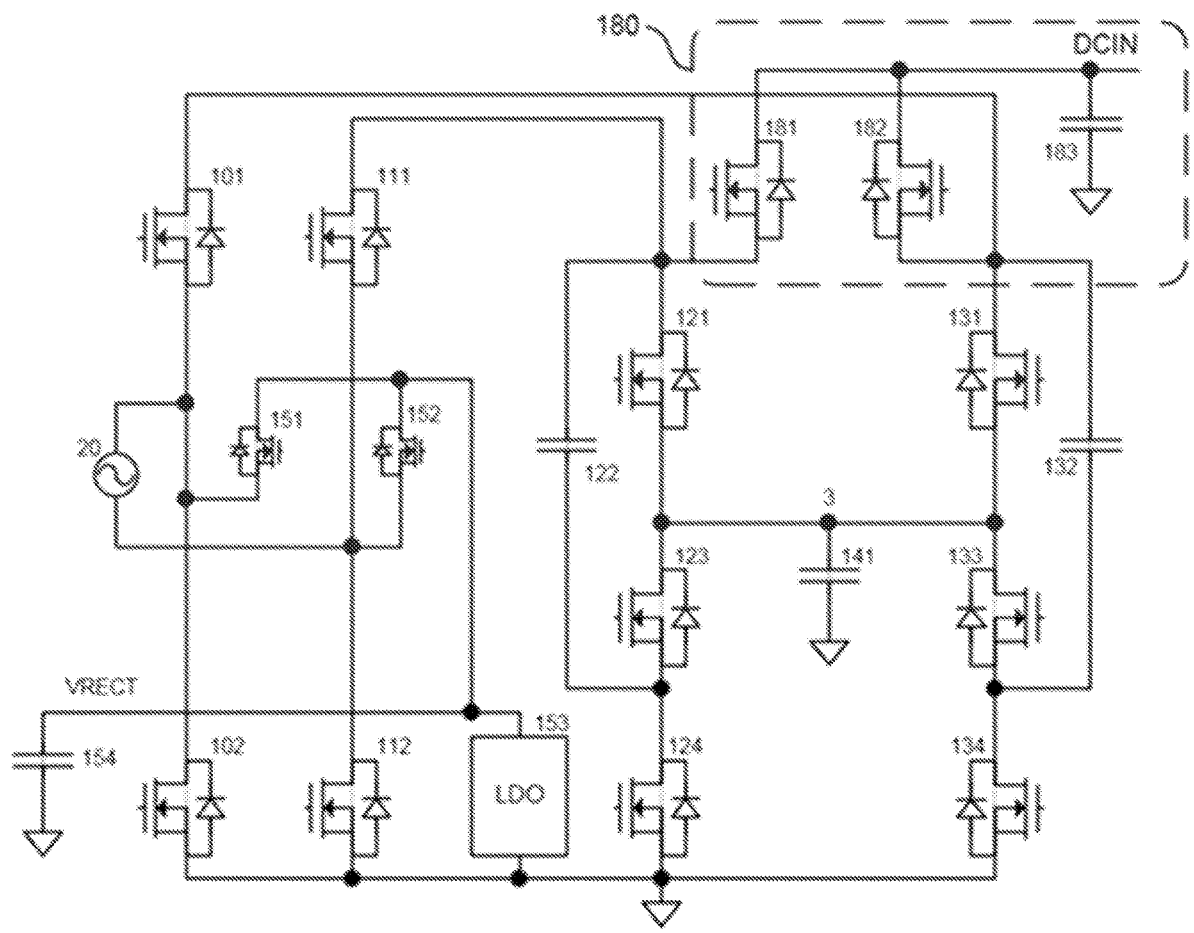
FIG. 6a is a schematic circuit diagram of a wireless charging receiver circuit according to an embodiment of the present disclosure.

Specifically, as illustrated in FIG. 6a, the first direct-current power supply unit 180 includes a fifteenth switch transistor 181, a sixteenth switch transistor 182, and a third capacitor 183. A source of the fifteenth switch transistor 181 is connected to the drain of the fifth switch transistor 121. A source of the sixteenth switch transistor 182 is connected to the drain of the eighth switch transistor 131. A drain of the fifteenth switch transistor 181 and a drain of the sixteenth switch transistor 182 are both connected to one terminal of the third capacitor 183, and the other terminal of the third capacitor 183 is connected to ground.

In the case that the wireless charging receiver circuit 10 operates in the direct-current input charge pump mode, the control unit 160 controls a third switch transistor group formed by the fifth switch transistor 121, the seventh switch transistor 124, the ninth switch transistor 133, and the sixteenth switch transistor 182 to be turned on or turned off at a third predetermined switching frequency. The control unit 160 controls a fourth switch transistor group formed by the sixth switch transistor 123, the eighth switch transistor 131, the tenth switch transistor 134, and the fifteenth switch transistor 181 to be turned on or turned off complementarily with the third switch transistor group at the third predetermined switching frequency, and controls the other switch transistors to be turned off.

It should be understood that a DCIN pin of the first direct-current power supply unit 180 is configured as an input of an external direct-current power supply. For example, the input may be a USB input or a direct-current power supply input.

Figure 7:
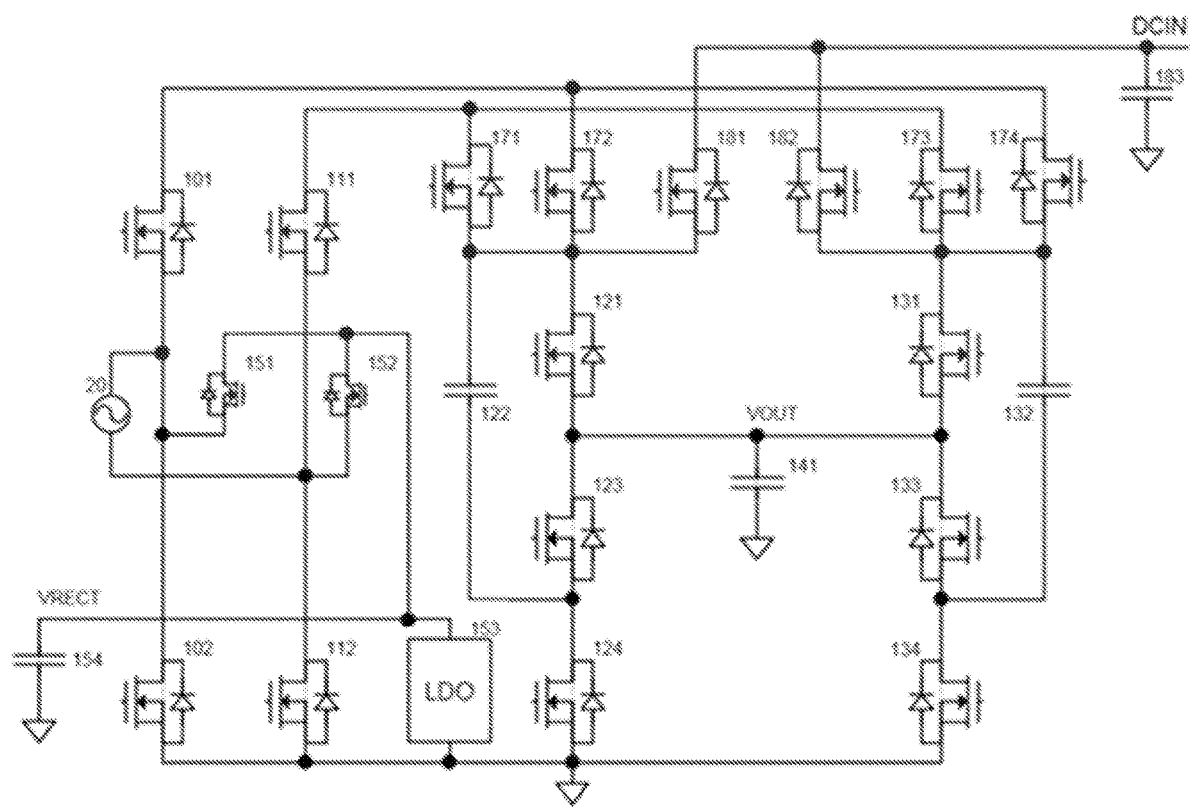
FIG. 7 is a schematic circuit diagram of a wireless charging receiver circuit according to an embodiment of the present disclosure.

In another embodiment, as illustrated in FIG. 7, the wireless charging receiver circuit 10 further includes the first frequency multiplier unit 170 and the first direct-current power supply unit 180 as described above. In this way, a charge pump operates at a switching frequency that is a multiple of an operating frequency of the wireless charging transmitter and a 2:1 charge pump that converts the direct-current power supply are simultaneously achieved.

Figure 8:
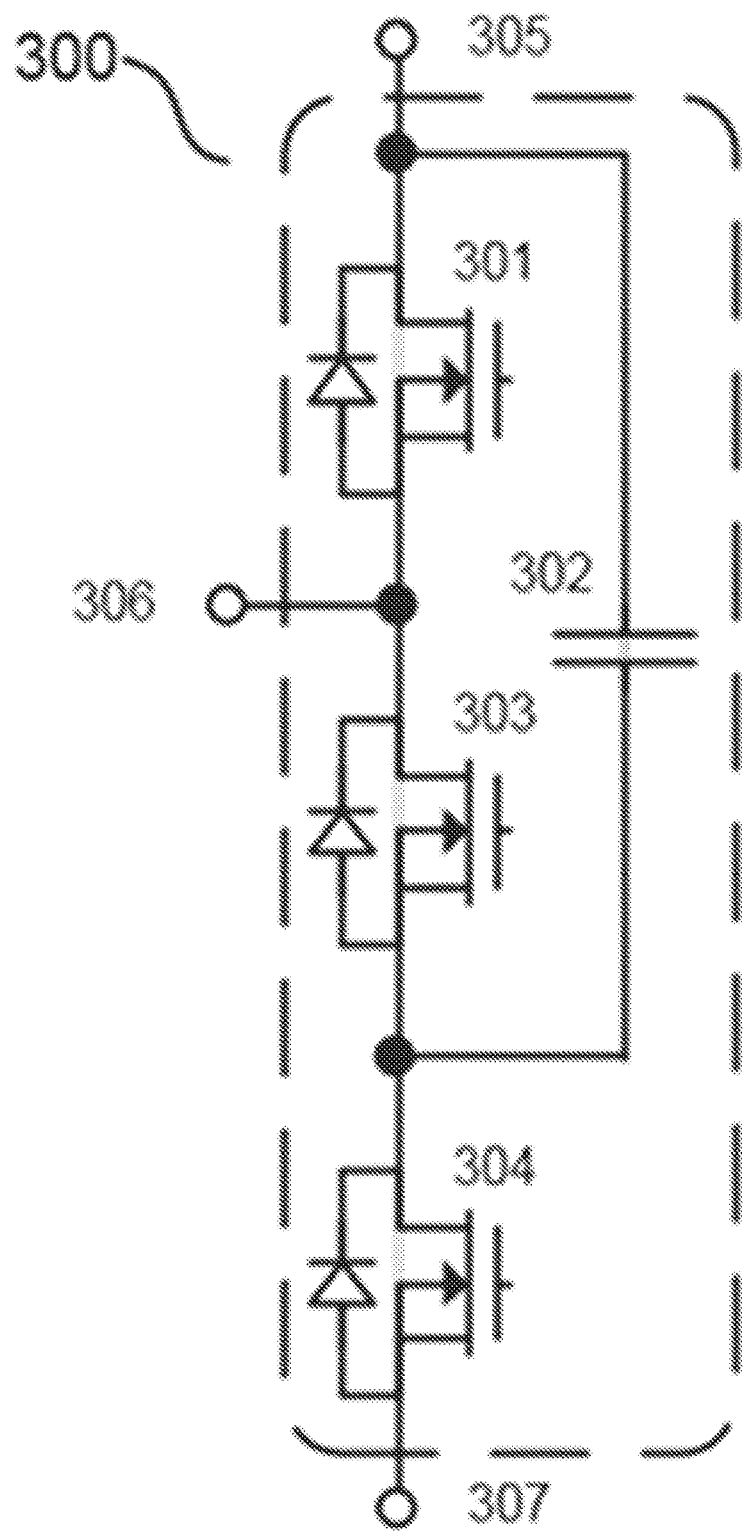
FIG. 8 is a schematic circuit diagram of a first expansion unit according to an embodiment of the present disclosure.

In another embodiment, the wireless charging receiver circuit 10 further includes at least one first expansion unit 300 as illustrated in FIG. 8. The at least one first expansion unit 300 is configured to convert a ratio of an effective value of a voltage difference between the first connection node 1 and the second connection node 2 to an output voltage of the wireless charging receiver circuit 10 to N:1. N is a positive integer.

The first expansion unit 300 includes a fourth capacitor 302, and a first expansion switch transistor 301, a second expansion switch transistor 303, and a third expansion switch transistor 304 that are successively series-connected in a same direction. One terminal of the fourth capacitor 302 is connected to a drain of the first expansion switch transistor 301, and the other terminal of the fourth capacitor 302 is connected to a source of the second expansion switch transistor 303. In addition, three connection nodes 305, 306 and 307 are used to connect other circuits.

Figure 9:
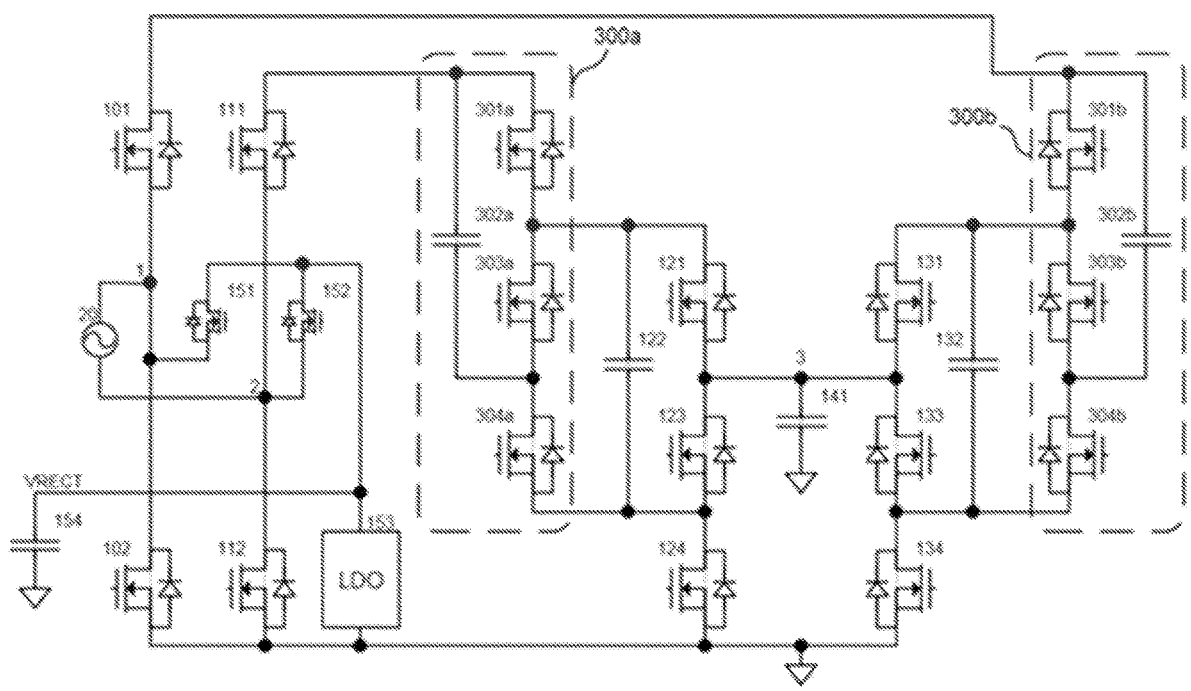
FIG. 9 is a schematic circuit diagram of a wireless charging receiver circuit according to an embodiment of the present disclosure.

In an embodiment, the wireless charging receiver circuit 10 includes two first expansion units 300, as illustrated in FIG. 9, that is, a first expansion unit 300a, a first expansion unit 300b. The two first expansion units 300 are configured to convert a conversion ratio of the effective value of the voltage difference between the first connection node 1 and the second connection node 2 to an output voltage of a voltage output terminal, that is, the voltage on the third connection node 3, to 3:1.

Specifically, the drain of the first expansion switch transistor 301a of one first expansion unit 300a of the two first expansion units is connected to the drain of the third switch transistor 111. A source of the first expansion switch transistor 301a of the one first expansion unit 300a is connected to the drain of the fifth switch transistor 121, and a source of the third expansion switch transistor 304a of the one first expansion unit 300a is connected to the source of the sixth switch transistor 123. The drain of the first expansion switch transistor 301b of the other first expansion unit 300b of the two first expansion units is connected to the drain of the first switch transistor 101. The source of the first expansion switch transistor 301b of the other first expansion unit 300b is connected to the drain of the eighth switch transistor 131, and the source of the third expansion switch transistor 304b of the other first expansion unit 300b is connected to the source of the ninth switch transistor 133.

In the case that the wireless charging receiver circuit 10 operates in the charge pump mode, in response to the alternating current signal 20 being in the positive half cycle, the control unit 160 controls the first switch transistor 101, the fourth switch transistor 112, the fifth switch transistor 121, the seventh switch transistor 124, the ninth switch transistor 133, the first expansion switch transistor 301a and the third expansion switch transistor 304a of the one first expansion unit 300a, and the second expansion switch transistor 303b of the other first expansion unit 300b to be turned on. In response to the alternating current signal 20 being in the negative half cycle, the control unit 160 controls the second switch transistor 102, the third switch transistor 111, the sixth switch transistor 123, the eighth switch transistor 131, the tenth switch transistor 134, the second expansion switch transistor 303a of the one first expansion unit 300a, and the first expansion switch transistor 301b and the third expansion switch transistor 304b of the other first expansion unit 300b to be turned on.

In practice, in response to the alternating current signal 20 being in the positive half cycle, that is, during the time period that the current is generated from the first connection node 1, the first switch transistor 101, the second expansion switch transistor 303b of the first expansion unit 300b, the ninth switch transistor 133, and the fourth switch transistor 112 are turned on. The first expansion switch transistor 301b of the first expansion unit 300b, the third expansion switch transistor 304b of the first expansion unit 300b, the eighth switch transistor 131, the tenth switch transistor 134 are maintained in a turn-off state to charge a second phase of the charge pump. In this case, a fourth capacitor 302b of the first expansion unit 300b, the second capacitor 132, and the first filter capacitor 141 are charged. Direct-current voltages at two terminals of the fourth capacitor 302b of the first expansion unit 300b, and the second capacitor 132 are equal to the output voltage of the third connection node 3. Therefore, during this time period, the voltage on the first connection node 1 is three times the voltage on the third connection node 3, and the voltage on the second connection node 2 is zero, such that a 3:1 DC conversion is generated. Meanwhile, during this time period, the first expansion switch transistor 301a of the one first expansion unit 300a, the third expansion switch transistor 304a of the first expansion unit 300a, the fifth switch transistor 121, and the seventh switch transistor 124 are turned on, such that a fourth capacitor 302a of the first expansion unit 300a, and the first capacitor 122 are discharged to the first filter capacitor 141. Likewise, in response to the alternating current signal 20 being in the negative half cycle, that is, during the time period that the current is output from the second connection node 2, the second switch transistor 102, the third switch transistor 111, the second expansion switch transistor 303a of the first expansion unit 300a, the sixth switch transistor 123 are turned on, and the first expansion switch transistor 301a of the one first expansion unit 300a, the third expansion switch transistor 304a of the one first expansion unit 300a, the fifth switch transistor 121 and the seventh switch transistor 124 are maintained in a turn-off state to charge a first phase of the charge pump. In this case, the fourth capacitor 302a of the first expansion unit 300a, the first capacitor 122, and the first filter capacitor 141 are charged. The direct-current voltages at two terminals of the fourth capacitor 302a of the first expansion unit 300a, and the first capacitor 122 are equal to the output voltage of the third connection node 3. Therefore, the voltage on the second connection node 2 is three times the output voltage of the third connection node 3, and the voltage on the first connection node 1 is zero. In the case that the alternating current signal 20 is reversed again, the above operations are cyclically repeated, and the switching frequency of the charge pump is synchronous with the operating frequency of the wireless charging transmitter.

Figure 10:
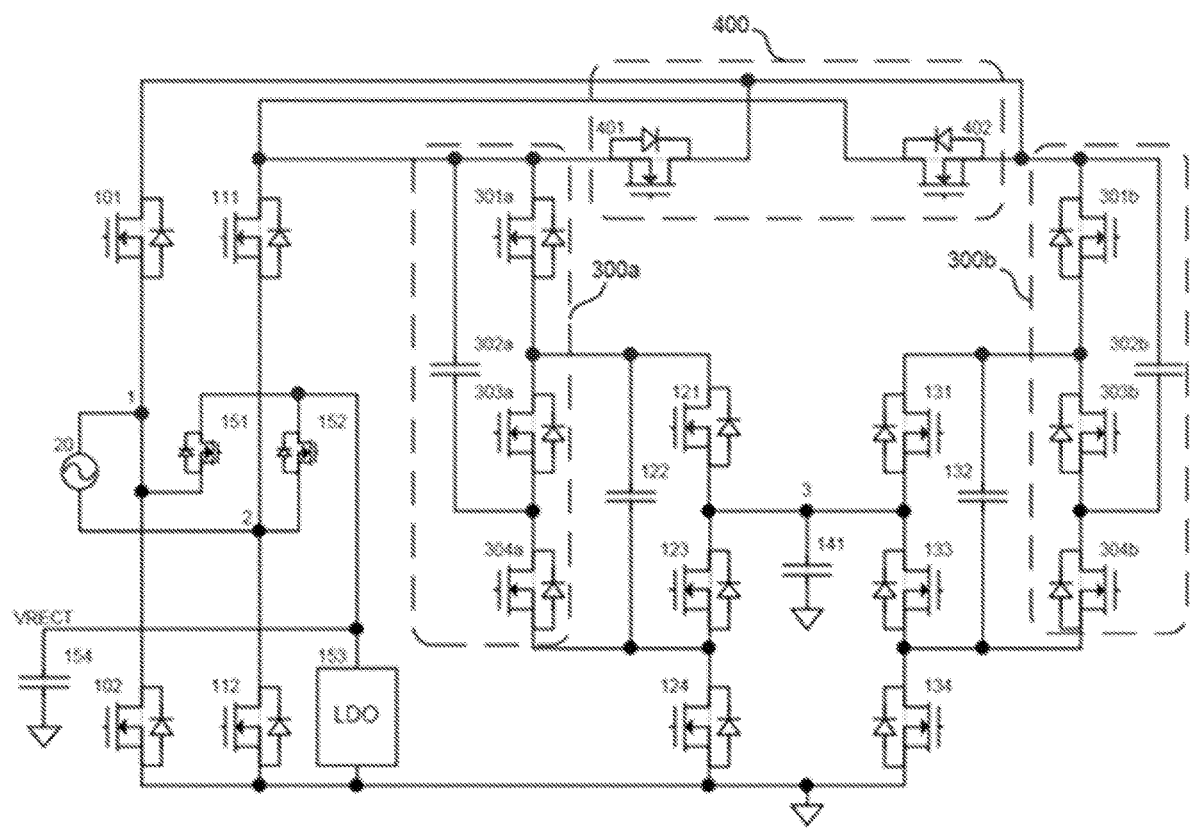
FIG. 10 is a schematic circuit diagram of a wireless charging receiver circuit according to an embodiment of the present disclosure.

Furthermore, a second frequency multiplier unit 400 may be added based on FIG. 9. As illustrated in FIG. 10, the wireless charging receiver circuit 10 further includes the second frequency multiplier unit 400. The second frequency multiplier unit 400 is connected to the first bridge arm unit 100, the second bridge arm unit 110, and the two first expansion units 300. With the second frequency multiplier unit 400, the first expansion unit 300, the first voltage converter unit 120, and the second voltage converter unit 130 operate in the switching frequency that is the integer multiple of the frequency of the alternating current signal 20.

The second frequency multiplier unit 400 includes a seventeenth switch transistor 401 and an eighteenth switch transistor 402. A source of the seventeenth switch transistor 401 and a drain of the eighteenth switch transistor 402 are both connected to the drain of the third switch transistor 111, and a drain of the seventeenth switch transistor 401 and a source of the eighteenth switch transistor 402 are both connected to the drain of the first switch transistor 101.

Figure 11:
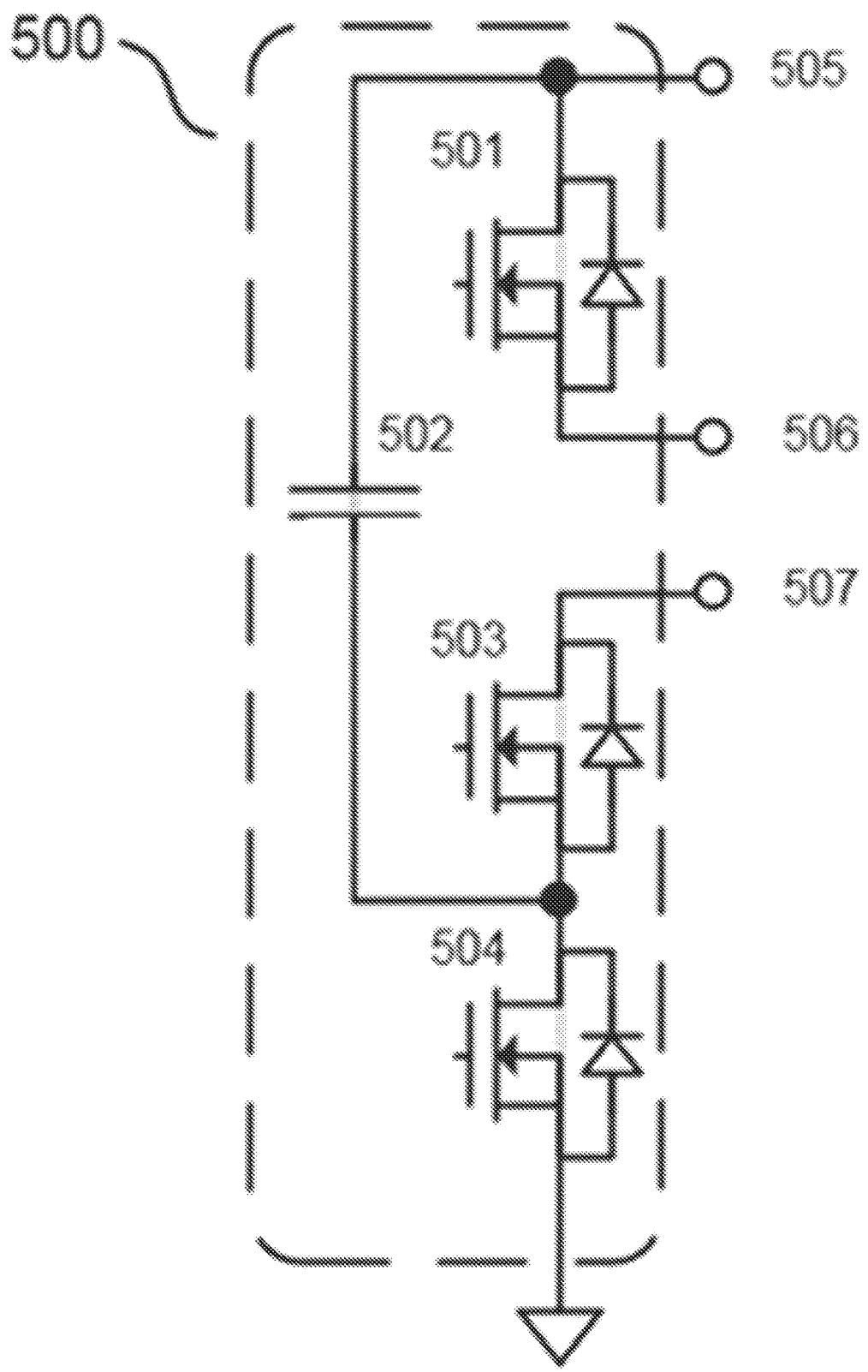
FIG. 11 is a schematic circuit diagram of a second expansion unit according to an embodiment of the present disclosure.

In another embodiment, as illustrated in FIG. 11, the wireless charging receiver circuit 10 further includes at least one second expansion unit 500. The second expansion unit 500 is configured to convert the ratio of the effective value of the voltage difference between the first connection node 1 and the second connection node 2 to the output voltage of the wireless charging receiver circuit 10 to M:1. M is a positive integer.

Optionally, the second expansion unit 500 includes a fifth capacitor 502, a fourth expansion switch transistor 501, a fifth expansion switch transistor 503, and a sixth expansion switch transistor 504. One terminal of the fourth capacitor 502 is connected to a drain of the fourth expansion switch transistor 501, and the other terminal of the fourth capacitor 502 is connected to a source of the fifth expansion switch transistor 503 and a drain of the sixth expansion switch transistor 504. A source of the sixth expansion switch transistor 504 is connected to ground. In addition, three connection nodes 305, 306, and 307 are used to connect other circuits.

Figure 12:
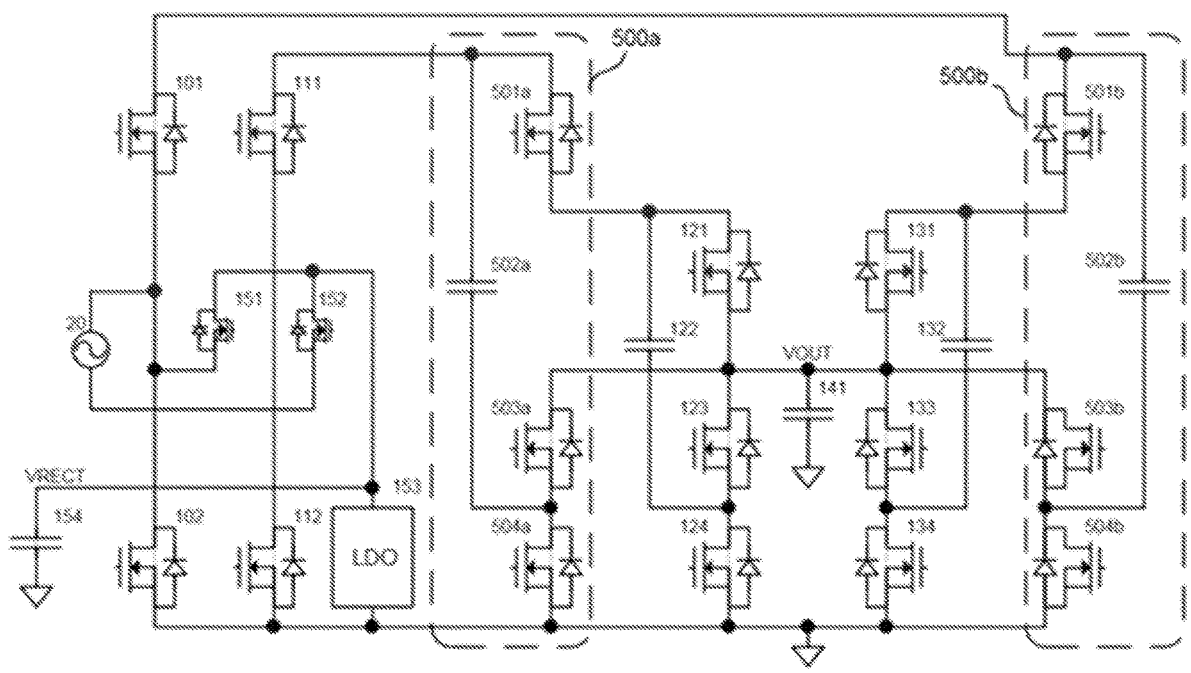
FIG. 12 is a schematic circuit diagram of a wireless charging receiver circuit according to an embodiment of the present disclosure.

In some embodiments, as illustrated in FIG. 12, the wireless charging receiver circuit 10 further includes two second expansion units 500. The two second expansion units 500 are configured to convert the conversion ratio of the effective value of the voltage difference between the first connection node 1 and the second connection node 2 to the output voltage of the voltage output terminal, that is, the voltage on the third connection node 3, to 3:1.

As illustrated in FIG. 12, the drain of the fourth expansion switch transistor 501a of one second expansion unit 500a of the two second expansion units is connected to the drain of the third switch transistor 111. A source of the fourth expansion switch transistor 501a of the one second expansion unit 500a is connected to the drain of the fifth switch transistor 121, and a drain of the fifth expansion switch transistor 503a of the one second expansion unit 500a is connected to the drain of the sixth switch transistor 123. The drain of the fourth expansion switch transistor 501b of the other second expansion unit 500b of the two second expansion units is connected to the drain of the first switch transistor 101. The source of the fourth expansion switch transistor 501b of the other second expansion unit 500b is connected to the drain of the eighth switch transistor 131, and the drain of the fifth expansion switch transistor 503b of the other second expansion unit 500b is connected to the drain of the ninth switch transistor 133.

In the case that the wireless charging receiver circuit 10 operates in the charge pump mode, in response to the alternating current signal 20 being in the positive half cycle, the control unit 160 controls the first switch transistor 101, the fourth switch transistor 112, the sixth switch transistor 123, the eighth switch transistor 131, the tenth switch transistor 134, the fourth expansion switch transistor 501a and the sixth expansion switch transistor 504a of the one second expansion unit 500a, and the fifth expansion switch transistor 503b of the other second expansion unit 500b to be turned on. In response to the alternating current signal 20 being in a negative half cycle, the control unit 160 controls the second switch transistor 102, the third switch transistor 111, the fifth switch transistor 121, the seventh switch transistor 124, the ninth switch transistor 133, the fifth expansion switch transistor 503a of the one second expansion unit 500a, and the fourth expansion switch transistor 501b and the sixth expansion switch transistor 504b of the other second expansion unit 500b to be turned on.

Figure 13:
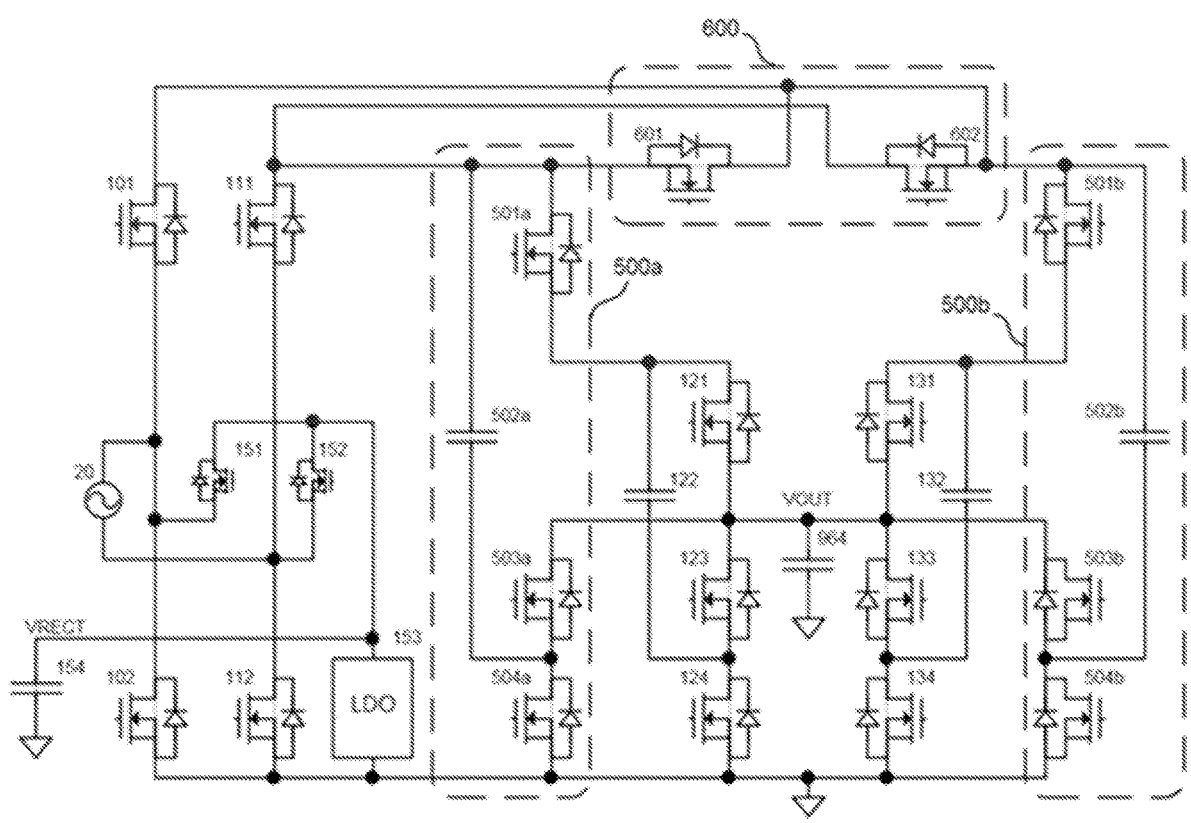
FIG. 13 is a schematic circuit diagram of a wireless charging receiver circuit according to an embodiment of the present disclosure.

Further, a third frequency multiplier unit 600 may be added based on FIG. 12. As illustrated in FIG. 13, the wireless charging receiver circuit 10 further includes a third frequency multiplier unit 600. The third frequency multiplier unit 600 is connected to the first bridge arm unit 100, the second bridge arm unit 110, and the two second expansion unit 500. With the third frequency multiplier unit 600, the second expansion units 500, the first voltage converter unit 120, and the second voltage converter unit 130 operate in the switching frequency that is the integer multiple of the frequency of the alternating current signal 20.

Specifically, the third frequency multiplier unit 600 includes a nineteenth switch transistor 601 and a twentieth switch transistor 602. A source of the nineteenth switch transistor 601 and a drain of the twentieth switch transistor 602 are both connected to the drain of the third switch transistor 111, and a drain of the nineteenth switch transistor 601 and a source of the twentieth switch transistor 602 are both connected to the drain of the first switch transistor 101.

It should be noted that a person skilled in the art may derive different combinations based on the embodiments of the present disclosure to propose other solutions. For example, four first expansion units 300 and the second frequency multiplier unit 400 are added to the circuit as illustrated in FIG. 2, such that each of the first expansion units 300, the first voltage converter unit 120, and the second voltage converter unit 130 operate at the switching frequency that is the integer multiple of the frequency of the alternating current signal 20, and the conversion ratio of the effective value of the voltage difference between the first connection node 1 and the second connection node 2 to the output voltage of the voltage output terminal is 4:1. Such solutions are derived from simple mathematical combinations according to the embodiments of the present disclosure, which pertain to simple variations or modifications of the present disclosure.

The present disclosure further provides a wireless charging receiver chip. The wireless charging receiver chip includes the wireless charging receiver circuit 10 as described above.

The present disclosure further provides a wireless charging receiver. The wireless charging receiver includes a wireless charging receiver coil and the wireless charging receiver chip as described above, wherein the wireless charging receiver coil is configured to generate the alternating current signal 20.

In summary, the present disclosure provides a wireless charging receiver circuit and chip, and a wireless charging receiver. The wireless charging receiver circuit includes a first bridge arm unit 100, a second bridge arm unit 110, a first voltage converter unit 120, a second voltage converter unit 130, and a control unit 160. One terminal of the first bridge arm unit 100 and one terminal of the second voltage converter unit 130 are both connected to a first node P1, one terminal of the second bridge arm unit 110 and one terminal of the first voltage converter unit 120 are both connected to a second node P2, and the other terminal of the first bridge arm unit 100, the other terminal of the second bridge arm unit 110, the other terminal of the first voltage converter unit 120, and the other terminal of the second voltage converter unit 130 are all connected to a common ground node GND. The first bridge arm unit 100 includes a first switch transistor 101 and a second switch transistor 102. The first switch transistor 101 and the second switch transistor 102 are series-connected in a same direction. A connection node between a source of the first switch transistor 101 and a drain of the second switch transistor 102 is a first connection node 1, and a non-inverting output terminal of an externally input alternating current signal 20 is connected to the first connection node 1. The second bridge arm unit 110 includes a third switch transistor 111 and a fourth switch transistor 112. The third switch transistor 111 and the fourth switch transistor 112 are series-connected in a same direction. A connection node between a source of the third switch transistor 111 and a drain of the fourth switch transistor 112 is a second connection node 2, and an inverting output terminal of the alternating current signal 20 is connected to the second connection node 2. In this way, the external filter capacitors are reduced, and thus the size of the integrated circuit device is reduced, and the integration cost is lowered.

Finally, it should be noted that the above embodiments are merely used to illustrate the technical solutions of the present disclosure rather than limiting the technical solutions of the present disclosure. Under the concept of the present disclosure, the technical features of the above embodiments or other different embodiments may be combined, the steps therein may be performed in any sequence, and various variations may be derived in different aspects of the present disclosure, which are not detailed herein for brevity of description. Although the present disclosure is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present disclosure.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A wireless charging receiver circuit comprising:
a first bridge arm unit, a second bridge arm unit, a first voltage converter unit, a second voltage converter unit, a filter circuit, a bias power supply circuit, and a control unit, wherein:
one terminal of the first bridge arm unit and one terminal of the second voltage converter unit are both connected to a first node;
one terminal of the second bridge arm unit and one terminal of the first voltage converter unit are both connected to a second node;
the other terminal of the first bridge arm unit, the other terminal of the second bridge arm unit, the other terminal of the first voltage converter unit, and the other terminal of the second voltage converter unit are all connected to a common ground node;
voltage output terminals of the first voltage converter unit and the second voltage converter unit are both connected to the filter circuit;
the first bridge arm unit comprises a first switch transistor and a second switch transistor, and wherein:
the first switch transistor and the second switch transistor are series-connected in a same direction;
a connection node between a source of the first switch transistor and a drain of the second switch transistor is a first connection node; and
a non-inverting output terminal of an externally input alternating current signal is connected to the first connection node;
the second bridge arm unit comprises a third switch transistor and a fourth switch transistor, and wherein:
the third switch transistor and the fourth switch transistor are series-connected in a same direction;
a connection node between a source of the third switch transistor and a drain of the fourth switch transistor is a second connection node; and
an inverting output terminal of the alternating current signal is connected to the second connection node;
the bias power supply circuit is arranged between the first connection node and the second connection node, and the bias power supply circuit is configured to supply a startup power; and
the control unit is connected to the first bridge arm unit, the second bridge arm unit, the first voltage converter unit, and the second voltage converter unit, and the control unit is configured to control turn-on processes or turn-off processes of the switch transistors based on the externally input alternating current signal, such that the voltage output terminals of the first voltage converter unit and the second voltage converter unit output a voltage signal.

2. The wireless charging receiver circuit according to claim 1, wherein:
the first voltage converter unit comprises a first capacitor, and a fifth switch transistor, a sixth switch transistor, and a seventh switch transistor successively series-connected in the same direction, and wherein:
one terminal of the first capacitor is connected to a drain of the fifth switch transistor;
the other terminal of the first capacitor is connected to a source of the sixth switch transistor;
a source of the seventh switch transistor is connected to ground; and
a connection node between the drain of the third switch transistor and the drain of the seventh switch transistor is the second node;
the second voltage converter unit comprises a second capacitor, and an eighth switch transistor, a ninth switch transistor, and a tenth switch transistor successively series-connected in the same direction, and wherein:
one terminal of the second capacitor is connected to a drain of the eighth switch transistor;
the other terminal of the second capacitor is connected to a source of the ninth switch transistor;
a source of the tenth switch transistor is connected to ground; and
a connection node between the drain of the first switch transistor and the drain of the eighth switch transistor is the first node; and
a connection node between the fifth switch transistor and the sixth switch transistor, and a connection node between the eighth switch transistor and the ninth switch transistor are both connected to the filter circuit at a third connection node.

3. The wireless charging receiver circuit according to claim 2, wherein:
an operating mode of the wireless charging receiver circuit comprises a bypass mode, and wherein in the bypass mode:
the control unit controls the seventh switch transistor and the tenth switch transistor to be turned on in response to voltages on the first capacitor and the second capacitor being less than a first predetermined voltage;
the control unit controls the fifth switch transistor and the eighth switch transistor to be turned on in response to the voltages on the first capacitor and the second capacitor being greater than or equal to the first predetermined voltage; and the control unit controls the first switch transistor and the fourth switch transistor to be alternately turned on with the second switch transistor and the third switch transistor in a synchronous rectification mode in response to a voltage on the third connection node being greater than or equal to a second predetermined voltage.

4. The wireless charging receiver circuit according to claim 2, wherein:
an operating mode of the wireless charging receiver circuit comprises a charge pump mode, and wherein in the charge pump mode:
in response to the alternating current signal being in a positive half cycle, the control unit controls the first switch transistor, the fourth switch transistor, the fifth switch transistor, the seventh switch transistor, and the ninth switch transistor to be turned on, and controls the other switch transistors to be turned off; and
in response to the alternating current signal being in a negative half cycle, the control unit controls the second switch transistor, the third switch transistor, the sixth switch transistor, the eighth switch transistor, and the tenth switch transistor to be turned on, and controls the other switch transistors to be turned off.

5. The wireless charging receiver circuit according to claim 2, wherein:
an operating mode of the wireless charging receiver circuit comprises a reverse bypass mode, and wherein in the reverse bypass mode:
the control unit controls the fifth switch transistor, the seventh switch transistor, the eighth switch transistor, and the tenth switch transistor to be turned on, and controls the sixth switch transistor and the ninth switch transistor to be turned off; and
the control unit controls the first switch transistor and the fourth switch transistor to be turned on or turned off phase-complementarily with the second switch transistor and the third switch transistor at a first predetermined switching frequency.

6. The wireless charging receiver circuit according to claim 2, wherein:
an operating mode of the wireless charging receiver circuit comprises a reverse charge pump mode, and wherein in the reverse charge pump mode:
the control unit controls a first switch transistor group formed by the first switch transistor, the fourth switch transistor, the fifth switch transistor, the seventh switch transistor, and the ninth switch transistor to be turned on or turned off at a second predetermined switching frequency; and
the control unit controls a second switch transistor group formed by the second switch transistor, the third switch transistor, the sixth switch transistor, the eighth switch transistor, and the tenth switch transistor to be turned on or turned off phase-complementarily with the first switch transistor group at the second predetermined switching frequency.

7. The wireless charging receiver circuit according to claim 2, further comprising:
a first frequency multiplier unit, wherein the first frequency multiplier unit is connected to the first bridge arm unit, the second bridge arm unit, the first voltage converter unit, and the second voltage converter unit, such that the first voltage converter unit and the second voltage converter unit operate in a switching frequency that is an integer multiple of a frequency of the alternating current signal.

8. The wireless charging receiver circuit according to claim 7, wherein:
the first frequency multiplier unit comprises an eleventh switch transistor, a twelfth switch transistor, a thirteenth switch transistor, and a fourteenth switch transistor, and wherein:
a source of the eleventh switch transistor is connected to a source of the twelfth switch transistor;
a drain of the eleventh switch transistor is connected to a drain of the third switch transistor;
a drain of the twelfth switch transistor is connected to a drain of the first switch transistor;
a source of the thirteenth switch transistor is connected to a source of the fourteenth switch transistor;
a drain of the thirteenth switch transistor is connected to the drain of the third switch transistor; and a drain of the fourteenth switch transistor is connected to the drain of the first switch transistor, and wherein when the wireless charging receiver circuit operates in a charge pump mode:
between a starting point of a positive half cycle and a peak of the positive half cycle of the alternating current signal, the control unit controls the first switch transistor, the fourth switch transistor, the fifth switch transistor, the seventh switch transistor, the ninth switch transistor, and the fourteenth switch transistor to be turned on, and controls the other switch transistors to be turned off;
between the peak of the positive half cycle and an end of the positive half cycle of the alternating current signal, the control unit maintains the first switch transistor and the fourth switch transistor in a turn-on state, controls the sixth switch transistor, the eighth switch transistor, the tenth switch transistor, and the twelfth switch transistor to be turned on, and controls the other switch transistors to be turned off;
between a start of a negative half cycle and a peak of the negative half cycle of the alternating current signal, the control unit controls the second switch transistor, the third switch transistor, the fifth switch transistor, the seventh switch transistor, the ninth switch transistor, and the thirteenth switch transistor to be turned on, and controls the other switch transistors to be turned off; and
between the peak of the negative half cycle and an end of the negative half cycle of the alternating current signal, the control unit maintains the second switch transistor and the third switch transistor in the turn-on state, controls the sixth switch transistor, the eighth switch transistor, the tenth switch transistor, and the eleventh switch transistor to be turned on, and controls the other switch transistors to be turned off.

9. The wireless charging receiver circuit according to claim 2, further comprising:
a first direct-current power supply unit, wherein the first direct-current power supply unit is configured to act as a direct-current power supply.

10. The wireless charging receiver circuit according to claim 9, wherein:
an operating mode of the wireless charging receiver circuit comprises a direct-current input charge pump mode;

the first direct-current power supply unit comprises a fifteenth switch transistor, a sixteenth switch transistor, and a third capacitor;

a source of the fifteenth switch transistor is connected to the drain of the fifth switch transistor;

a source of the sixteenth switch transistor is connected to the drain of the eighth switch transistor;

a drain of the fifteenth switch transistor and a drain of the sixteenth switch transistor are both connected to one terminal of the third capacitor; and the other terminal of the third capacitor is connected to ground, and wherein when the wireless charging receiver circuit operates in the direct-current input charge pump mode:

the control unit controls a third switch transistor group formed by the fifth switch transistor, the seventh switch transistor, the ninth switch transistor, and the sixteenth switch transistor to be turned on or turned off at a third predetermined switching frequency; and the control unit controls a fourth switch transistor group formed by the sixth switch transistor, the eighth switch transistor, the tenth switch transistor, and the fifteenth switch transistor to be turned on or turned off complementarily with the third switch transistor group at the third predetermined switching frequency, and controls the other switch transistors to be turned off.

11. The wireless charging receiver circuit according to claim 2, further comprising:

at least one first expansion unit, wherein the first expansion unit is configured to convert a ratio of an effective value of an amplitude of an alternating-current voltage signal between the first connection node and the second connection node to an output voltage of the wireless charging receiver circuit to N:1, wherein N is a positive integer.

12. The wireless charging receiver circuit according to claim 11, wherein:

the first expansion unit comprises a fourth capacitor, and a first expansion switch transistor, a second expansion switch transistor, and a third expansion switch transistor successively series-connected in a same direction; and one terminal of the fourth capacitor is connected to a drain of the first expansion switch transistor, and the other terminal of the fourth capacitor is connected to a source of the second expansion switch transistor, and wherein:

in the case that the first expansion unit is connected to the first bridge arm unit and the second voltage converter unit, the drain of the first expansion switch transistor is connected to the drain of the first switch transistor, the drain of the second expansion switch transistor is connected to the drain of the eighth switch transistor, and the source of the third expansion switch transistor is connected to the source of the ninth switch transistor; and in the case that the first expansion unit is connected to the second bridge arm unit and the first voltage converter unit, the drain of the first expansion switch transistor is connected to the drain of the third switch transistor, the drain of the second expansion switch transistor is connected to the drain of the fifth switch transistor, and the source of the third expansion switch transistor is connected to the source of the sixth switch transistor.

13. The wireless charging receiver circuit according to claim 12, further comprising:

two first expansion units, wherein the two first expansion units are configured to convert a conversion ratio of the effective value of the amplitude of the alternating-current voltage signal between the first connection node and the second connection node to an output voltage of the voltage output terminal to 3:1.

14. The wireless charging receiver circuit according to claim 13, wherein:

the drain of a first expansion switch transistor of one first expansion unit of the two first expansion units is connected to the drain of the third switch transistor;

a source of the first expansion switch transistor of the one first expansion unit is connected to the drain of the fifth switch transistor;

a source of the third expansion switch transistor of the one first expansion unit is connected to the source of the sixth switch transistor;

the drain of the first expansion switch transistor of the other first expansion unit of the two first expansion units is connected to the drain of the first switch transistor;

the source of the first expansion switch transistor of the other first expansion unit is connected to the drain of the eighth switch transistor; and the source of the third expansion switch transistor of the other first expansion unit is connected to the source of the ninth switch transistor, and wherein when the wireless charging receiver circuit operates in a charge pump mode:

in response to the alternating current signal being in a positive half cycle, the control unit controls the first switch transistor, the fourth switch transistor, the fifth switch transistor, the seventh switch transistor, the ninth switch transistor, the first expansion switch transistor and the third expansion switch transistor of the one first expansion unit, and the second expansion switch transistor of the other first expansion unit to be turned on, and controls the other switch transistors to be turned off; and in response to the alternating current signal being in a negative half cycle, the control unit controls the second switch transistor, the third switch transistor, the sixth switch transistor, the eighth switch transistor, the tenth switch transistor, the second expansion switch transistor of the one first expansion unit, and the first expansion switch transistor and the third expansion switch transistor of the other first expansion unit to be turned on, and controls the other switch transistors to be turned off.

15. The wireless charging receiver circuit according to claim 14, further comprising:

a second frequency multiplier unit, wherein:

the second frequency multiplier unit is connected to the first bridge arm unit, the second bridge arm unit, and the two first expansion units, such that the first expansion unit, the first voltage converter unit; and the second voltage converter unit operate in a switching frequency that is an integer multiple of a frequency of the alternating current signal.

16. The wireless charging receiver circuit according to claim 15, wherein:

the second frequency multiplier unit comprises a seventeenth switch transistor and an eighteenth switch transistor, and wherein:

a source of the seventeenth switch transistor and a drain of the eighteenth switch transistor are both connected to the drain of the third switch transistor; and a drain of the seventeenth switch transistor and a source of the eighteenth switch transistor are both connected to the drain of the first switch transistor.

17. The wireless charging receiver circuit according to claim 2, further comprising:
at least one second expansion unit, wherein the second expansion unit is configured to convert a ratio of an effective value of an amplitude of an alternating-current voltage signal between the first connection node and the second connection node to an output voltage of the wireless charging receiver circuit to M:1, wherein M is a positive integer.

18. The wireless charging receiver circuit according to claim 17, wherein:
the second expansion unit comprises a fifth capacitor, a fourth expansion switch transistor, a fifth expansion switch transistor, and a sixth expansion switch transistor;
one terminal of a fourth capacitor is connected to a drain of the fourth expansion switch transistor;
the other terminal of the fourth capacitor is connected to a source of the fifth expansion switch transistor and a drain of the sixth expansion switch transistor; and
a source of the sixth expansion switch transistor is connected to ground, and wherein:
in the case that the second expansion unit is connected to the first bridge arm unit and the second voltage converter unit, the drain of the fourth expansion switch transistor is connected to the drain of the first switch transistor, the source of the fourth expansion switch transistor is connected to the drain of the eighth switch transistor, and the drain of the fifth expansion switch transistor is connected to the drain of the ninth switch transistor; and
in the case that the second expansion unit is connected to the second bridge arm unit and the first voltage converter unit, the drain of the fourth expansion switch transistor is connected to the drain of the third switch transistor, the source of the fourth expansion switch transistor is connected to the drain of the fifth switch transistor, and the drain of the fifth expansion switch transistor is connected to the drain of the sixth switch transistor.

19. The wireless charging receiver circuit according to claim 18, further comprising:
two second expansion units, wherein the two second expansion units are configured to convert a conversion ratio of the effective value of the amplitude of the alternating-current voltage signal between the first connection node and the second connection node to an output voltage of the voltage output terminal to 3:1.

20. The wireless charging receiver circuit according to claim 19, wherein:
the drain of a fourth expansion switch transistor of one second expansion unit of the two second expansion units is connected to the drain of the third switch transistor;
a source of the fourth expansion switch transistor of the one second expansion unit is connected to the drain of the fifth switch transistor;
a drain of the fifth expansion switch transistor of the one second expansion unit is connected to the drain of the sixth switch transistor;
the drain of the fourth expansion switch transistor of the other second expansion unit of the two second expansion units is connected to the drain of the first switch transistor;
the source of the fourth expansion switch transistor of the other second expansion unit is connected to the drain of the eighth switch transistor; and
the drain of the fifth expansion switch transistor of the other second expansion unit is connected to the drain of the ninth switch transistor, and wherein when the wireless charging receiver circuit operates in a charge pump mode:
in response to the alternating current signal being in a positive half cycle, the control unit controls the first switch transistor, the fourth switch transistor, the sixth switch transistor, the eighth switch transistor, the tenth switch transistor, the fourth expansion switch transistor and the sixth expansion switch transistor of the one second expansion unit, and the fifth expansion switch transistor of the other second expansion unit to be turned on, and controls the other switch transistors to be turned off; and
in response to the alternating current signal being in a negative half cycle, the control unit controls the second switch transistor, the third switch transistor, the fifth switch transistor, the seventh switch transistor, the ninth switch transistor, the fifth expansion switch transistor of the one second expansion unit, and the fourth expansion switch transistor and the sixth expansion switch transistor of the other second expansion unit to be turned on, and controls the other switch transistors to be turned off.

21. The wireless charging receiver circuit according to claim 20, further comprising:
a third frequency multiplier unit, wherein the third frequency multiplier unit is connected to the first bridge arm unit, the second bridge arm unit, and the two second expansion units, such that the second expansion unit, the first voltage converter unit, and the second voltage converter unit operate in a switching frequency that is an integer multiple of a frequency of the alternating current signal.

22. The wireless charging receiver circuit according to claim 21, wherein:
the third frequency multiplier unit comprises a nineteenth switch transistor and a twentieth switch transistor, and wherein:
a source of the nineteenth switch transistor and a drain of the twentieth switch transistor are both connected to the drain of the third switch transistor; and
a drain of the nineteenth switch transistor and a source of the twentieth switch transistor are both connected to the drain of the first switch transistor.

23. A wireless charging receiver chip comprising:
a wireless charging receiver circuit, wherein the wireless charging receiver circuit comprises:
a first bridge arm unit, a second bridge arm unit, a first voltage converter unit, a second voltage converter unit, a filter circuit, a bias power supply circuit, and a control unit, wherein:
one terminal of the first bridge arm unit and one terminal of the second voltage converter unit are both connected to a first node;
one terminal of the second bridge arm unit and one terminal of the first voltage converter unit are both connected to a second node;
the other terminal of the first bridge arm unit, the other terminal of the second bridge arm unit, the other terminal of the first voltage converter unit, and the other terminal of the second voltage converter unit are all connected to a common ground node;

voltage output terminals of the first voltage converter unit and the second voltage converter unit are both connected to the filter circuit;

the first bridge arm unit comprises a first switch transistor and a second switch transistor, and wherein:
the first switch transistor and the second switch transistor are series-connected in a same direction,
a connection node between a source of the first switch transistor and a drain of the second switch transistor is a first connection node; and
a non-inverting output terminal of an externally input alternating current signal being connected to the first connection node;

the second bridge arm unit comprises a third switch transistor and a fourth switch transistor, and wherein:
the third switch transistor and the fourth switch transistor are series-connected in a same direction;
a connection node between a source of the third switch transistor and a drain of the fourth switch transistor is a second connection node; and
an inverting output terminal of the alternating current signal being connected to the second connection node;

the bias power supply circuit is arranged between the first connection node and the second connection node, and the bias power supply circuit is configured to supply a startup power; and the control unit is connected to the first bridge arm unit, the second bridge arm unit, the first voltage converter unit, and the second voltage converter unit, and the control unit is configured to control turn-on processes or turn-off processes of the switch transistors based on the externally input alternating current signal, such that the voltage output terminals of the first voltage converter unit and the second voltage converter unit output a voltage signal.

24. A wireless charging receiver, comprising:
a wireless charging receiver coil and a wireless charging receiver chip, wherein:
the wireless charging receiver coil is configured to generate an alternating current signal, and
the wireless charging receiver chip comprises a wireless charging receiver circuit comprising:
a first bridge arm unit, a second bridge arm unit, a first voltage converter unit, a second voltage converter unit, a filter circuit, a bias power supply circuit, and a control unit, and wherein:
one terminal of the first bridge arm unit and one terminal of the second voltage converter unit are both connected to a first node;
one terminal of the second bridge arm unit and one terminal of the first voltage converter unit are both connected to a second node;
the other terminal of the first bridge arm unit, the other terminal of the second bridge arm unit, the other terminal of the first voltage converter unit, and the other terminal of the second voltage converter unit are all connected to a common ground node;
voltage output terminals of the first voltage converter unit and the second voltage converter unit are both connected to the filter circuit;
the first bridge arm unit comprises a first switch transistor and a second switch transistor, and wherein:
the first switch transistor and the second switch transistor are series-connected in a same direction;
a connection node between a source of the first switch transistor and a drain of the second switch transistor is a first connection node; and
a non-inverting output terminal of an externally input alternating current signal being connected to the first connection node;
the second bridge arm unit comprises a third switch transistor and a fourth switch transistor, and wherein:
the third switch transistor and the fourth switch transistor are series-connected in a same direction;
a connection node between a source of the third switch transistor and a drain of the fourth switch transistor is a second connection node; and
an inverting output terminal of the alternating current signal being connected to the second connection node;
the bias power supply circuit is arranged between the first connection node and the second connection node, and the bias power supply circuit is configured to supply a startup power; and
the control unit is connected to the first bridge arm unit, the second bridge arm unit, the first voltage converter unit, and the second voltage converter unit, and the control unit is configured to control turn-on processes or turn-off processes of the switch transistors based on the externally input alternating current signal, such that the voltage output terminals of the first voltage converter unit and the second voltage converter unit output a voltage signal.

* * * * *

UNITED STATES PATENT AND TRADEMARK OFFICE
CERTIFICATE OF CORRECTION

| | | |
|---|---|---|
| PATENT NO. | : 11,290,027 B1 | Page 1 of 1 |
| APPLICATION NO. | : 17/410694 | |
| DATED | : March 29, 2022 | |
| INVENTOR(S) | : Han et al. | |

It is certified that error appears in the above-identified patent and that said Letters Patent is hereby corrected as shown below:

On the Title Page

Item (65) insert --Prior Publication Data, US 2022/0094277 A1 Mar. 24, 2022--

Signed and Sealed this
Twenty-first Day of June, 2022

Katherine Kelly Vidal
*Director of the United States Patent and Trademark Office*